US 6,728,168 B2

(12) United States Patent
Kido

(10) Patent No.: US 6,728,168 B2
(45) Date of Patent: Apr. 27, 2004

(54) CARRIAGE EJECTION MECHANISM AND CARRIAGE RETAINING MECHANISM

(75) Inventor: Kunio Kido, Tokyo (JP)

(73) Assignee: Sankyo Seiki Mfg. Co., Ltd., Nagano (JP)

( * ) Notice: Subject to any disclaimer, the term of this patent is extended or adjusted under 35 U.S.C. 154(b) by 90 days.

(21) Appl. No.: 10/132,082

(22) Filed: Apr. 23, 2002

(65) Prior Publication Data
US 2002/0163863 A1 Nov. 7, 2002

(30) Foreign Application Priority Data
Apr. 25, 2001 (JP) ........................................ 2001-127226
Jan. 22, 2002 (JP) ........................................ 2002-012903

(51) Int. Cl.⁷ .......................... G11B 15/68; G11B 17/22
(52) U.S. Cl. ................... 369/30.9; 369/30.92; 369/75.2
(58) Field of Search ............................. 369/30.92, 30.9, 369/75.2

(56) References Cited

U.S. PATENT DOCUMENTS

| 5,485,436 | A | * | 1/1996 | Forget et al. | ............ 369/30.52 |
| 5,524,002 | A | * | 6/1996 | Morita et al. | ............... 369/191 |
| 5,878,016 | A | * | 3/1999 | Kubokawa et al. | ...... 369/30.95 |
| 5,970,036 | A | * | 10/1999 | Matsugase | .................. 369/75.1 |
| 6,031,811 | A | * | 2/2000 | Umesaki et al. | ......... 369/30.92 |
| 2002/0024896 | A1 | * | 2/2002 | Ogawa | ..................... 369/30.86 |

FOREIGN PATENT DOCUMENTS

| EP | 905686 A2 | * | 3/1999 | ........... G11B/15/68 |
| JP | 63293748 A | * | 11/1988 | ........... G11B/17/10 |
| JP | 10069695 A | * | 3/1998 | ........... G11B/17/22 |
| JP | 2001057002 A | * | 2/2001 | ........... G11B/17/26 |
| JP | 2001210000 A | * | 8/2001 | ........... G11B/17/26 |

* cited by examiner

Primary Examiner—William Klimowicz
(74) Attorney, Agent, or Firm—Hogan & Hartson L.L.P.

(57) ABSTRACT

A carriage ejection mechanism has a drawer, which moves back and forth between a stock position and an eject position, a plurality of carriages contained inside the drawer in a slidable manner in the direction in which the drawer moves and in a vertically stacked manner, and a slide control device that slides the carriages relative to the drawer. The slide control device slides upper carriages relatively more towards the stock position than the lower carriages such that the plurality of carriages are positioned successively staggered in a stair-like manner in the eject position.

21 Claims, 29 Drawing Sheets

CARRIAGE EJECTION MECHANISM AND CARRIAGE RETAINING MECHANISM

BACKGROUND OF THE INVENTION

1) Field of the Invention

The present invention relates to a carriage ejection mechanism and a carriage retaining mechanism. More particularly, the present invention relates to a carriage ejection mechanism and a carriage retaining mechanism provided on disc changers of CD players and DVD players.

2) Description of Related Art

There are CD and/or DVD players in which plural discs are stocked within the players, and a single disc is selected and played from among the plural discs. Such type of players is equipped with disc changers that can simultaneously stock a plurality of discs. The disc changers have a plurality of carriages on which to place the discs, and when playing a disc, the carriage with the desired disc is carried from a stock position to a disc playing position where a reproducing device of the player is located. And when changing a disc, the applicable carriage is ejected forward of the player, i.e., moved from the stock position to an eject position.

The carriages are contained inside a drawer, which moves back and forth between the stock position and the eject position, in a slidable manner in the direction the drawer moves. The drawer holds a vertical stack of a plurality of carriages. When changing discs in stock, the entire drawer along with the carriages is moved to the eject position to expose the discs on various carriages.

In one type, only the carriage with the disc to be replaced is ejected with the drawer and the discs are replaced one at a time. In another type, the carriage with the disc to be replaced as well as all carriages below it are ejected together, which allows the desired disc to be replaced in this state and the discs on the carriages below to be replaced by manually sliding back the original carriage and/or any other carriages above the carriage with another disc to be replaced.

However, in the type of disc changers where the discs are replaced one at a time, all discs have to be ejected in sequence one by one to check the discs in stock, thus making this a time-consuming and onerous process.

Also, in the type of disc changers in which the carriage having the desired disc as well as all carriages below are pulled out together in a stack, although a plurality of discs pulled out can be checked individually since the plurality of carriages are ejected together, the upper carriages have to be manually slid back in order to check the discs on carriages stacked below. Furthermore, if the desired disc is not the disc on the top carriage, since not all discs are ejected, the top disc must be selected again and the eject operation repeated in order to check all discs. As a result, this also is a time-consuming and onerous operation and as difficult to use as the type of disc changers described first.

SUMMARY OF THE INVENTION

The present invention relates to a carriage ejection mechanism and a carriage retaining mechanism that would allow all discs to be checked all at once.

In accordance with one embodiment of the present invention, a carriage ejection mechanism comprises a drawer that moves back and forth between a stock position and an eject position, and a plurality of carriages contained in the drawer and on which discs are placed, wherein the carriages are ejected successively staggered in a stair-like manner with an eject operation of the drawer. As a result, discs on all carriages can be checked all at once.

For example, a carriage ejection mechanism can be structured to comprise a drawer, which moves back and forth between a stock position and an eject position, a plurality of carriages contained inside the drawer in a slidable manner in the direction the drawer moves and in a vertically stacked manner, and a slide control device that slides the carriages towards the stock position relative to the drawer when the drawer moves towards the eject position, wherein the slide control device slides the upper carriages relatively more towards the stock position than the lower carriages and where the amount of slide of the top most carriage allows at least a part of the disc mounted thereon to be exposed from the main body.

In the carriage ejection mechanism having such a structure, when the drawer is moved towards the eject position, the slide control device moves the carriages more towards the stock position relative to the drawer the higher the carriage is. In other words, when the carriages are pulled out along with the drawer, the more the slide control device reduces the amount the carriages are pulled out, the higher the carriage is located. Consequently, all carriages from the top most to the bottom most are pulled out in a slightly staggered manner.

In a carriage ejection mechanism according to the present invention, by having at least one of the carriages eject in such a way that its disc can be viewed in its entirety, at least one disc can be replaced when all carriages are ejected staggered in a stair-like manner.

Further, a carriage ejection mechanism according to the present invention comprises a drawer, which moves back and forth between a stock position and two eject positions, and a plurality of carriages on which discs are placed and which are contained inside the drawer, wherein the carriages eject successively staggered in a stair-like manner with an eject operation of the drawer to a first eject position, and where a designated carriage and all carriages below are ejected in a stacked manner with an eject operation of the drawer to the second eject position.

Consequently, there are two modes of eject operation. In the eject mode to the first eject position, the discs on all carriages can be checked all at once. And in the eject mode to the second eject position, the carriages are pulled out so that the designated discs is on top, which allows the designated disc to be replaced without any further operations.

A carriage ejection mechanism, for example, can be structured to have an individual ejection device that would keep in the stock position all carriages above a designated carriage when the drawer moves to the eject position.

In the carriage ejection mechanism having such a structure, the individual ejection device allows the designated carriage and all carriages below to be pulled out when the drawer projects out to the eject position. As a result, the designated carriage and all carriages below are pulled out in a stack.

In a carriage ejection mechanism according to the present invention, a plurality of carriages may be contained in a manually slidable manner when the drawer is ejected.

In this case, the carriages inside the drawer can be slid back when the drawer is ejected. By sliding a carriage back, the carriage below it is exposed and its disc can be replaced.

Furthermore, in a disc player comprising a plurality of carriages on which discs are placed and a drawer that contains the plurality of carriages in a slidable manner and that also moves the plurality of carriages outside the device to eject the discs, a carriage retaining mechanism according to the present invention retains the carriages so that whether all discs are in place can be checked viewed from above when the discs are ejected and when the carriages within the drawer are stacked in a staggered manner towards the back of the drawer in sequence from the bottom tier.

Consequently, with an eject operation of the drawer the carriages are ejected successively staggered in a stair-like manner.

A carriage retaining mechanism according to the present invention can be structured so that the top most disc can be replaced in the ejected state, while the discs in lower tiers can be replaced by moving the upper carriages back.

In this case, the top most disc is completely exposed so that its entirety can be viewed, while discs in lower tiers are ejected so that they are stacked staggered in a stair-like manner in positions forward of the fully ejected position. The top most disc is exposed in its entirety and therefore can be replaced without moving the carriage it is on. And discs on tiers other than the top most tier can be replaced after sliding backward the carriage(s) above the desired carriage and exposing the desired disc.

Further a carriage retaining mechanism according to the present invention can be structured so that the disc on the bottom tier can be replaced in the ejected state without any further operations, while discs in upper tiers can be replaced after moving the carriages.

Consequently, the disc on the bottom most tier is completely exposed so that its entirety can be viewed, while discs in upper tiers are ejected so that they are stacked staggered in a stair-like manner in positions relatively rear of the fully ejected position. The bottom disc is exposed in its entirety and therefore can be replaced without moving the carriages it is on. And discs on tiers other than the bottom tier can be replaced after sliding the desired carriage with the desired disc and the carriage(s) above it to expose the desired disc.

Moreover, a carriage retaining mechanism according to the present invention can be structured so that a plurality of carriages are retained in positions nearly uniformly staggered when ejected, which allows the discs on the carriages to be viewed in a nearly uniform manner from above.

As a result, all discs are ejected generally uniformly staggered in a stair-like manner. To replace discs, the desired carriage with the desired disc and the carriage(s) above it are slid until the carriage with the desired disc is fully ejected to expose the disc.

Other features and advantages of the invention will be apparent from the following detailed description, taken in conjunction with the accompanying drawings that illustrate, by way of example, various features of embodiments of the invention.

EMBODIMENTS OF THE PRESENT INVENTION

Figure 1:
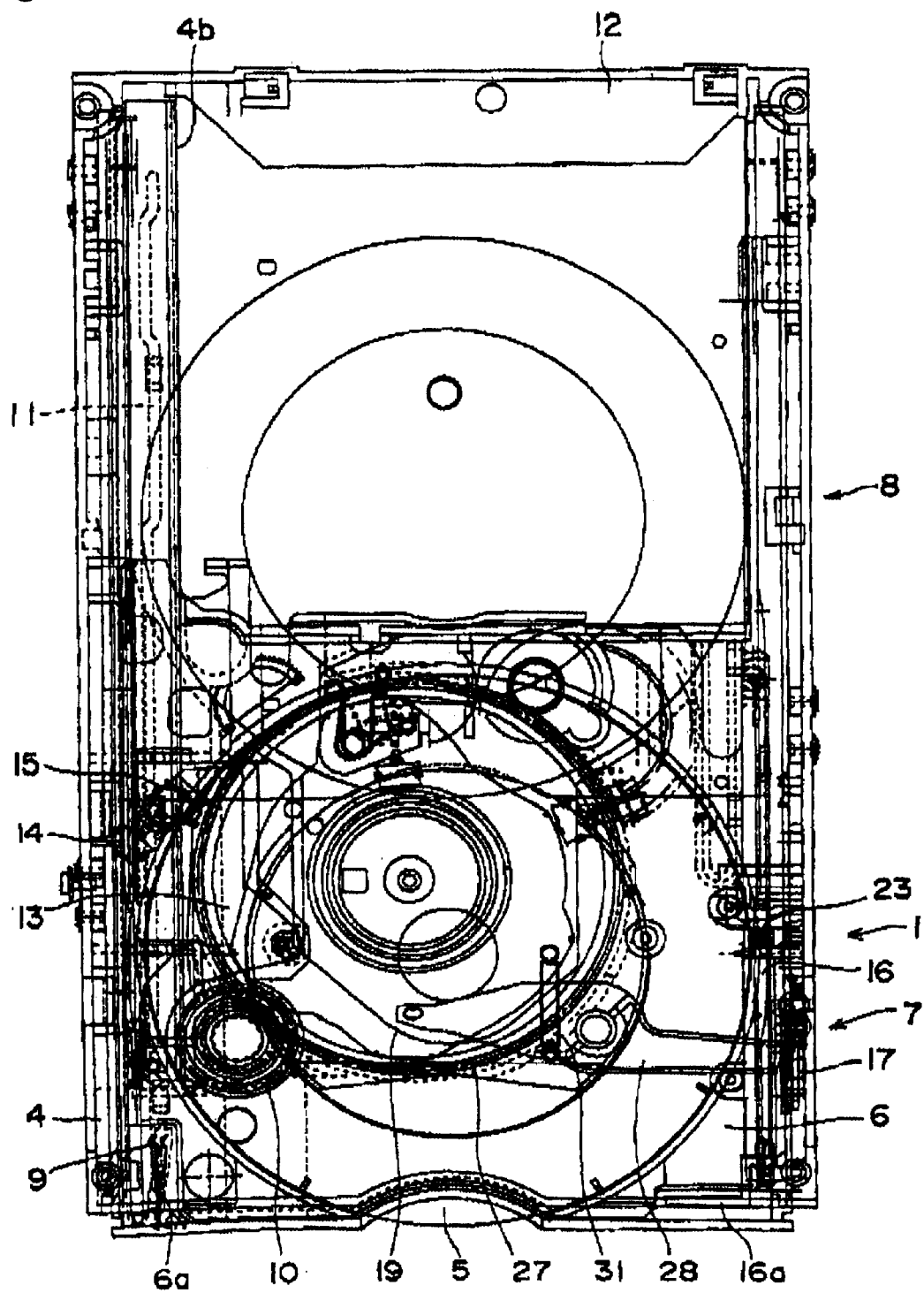
FIG. 1 shows an example of a carriage ejection mechanism in accordance with an embodiment of the present invention, and schematically shows a plan view of relative positions of components when carriages are contained in a stock position.
Figure 2:
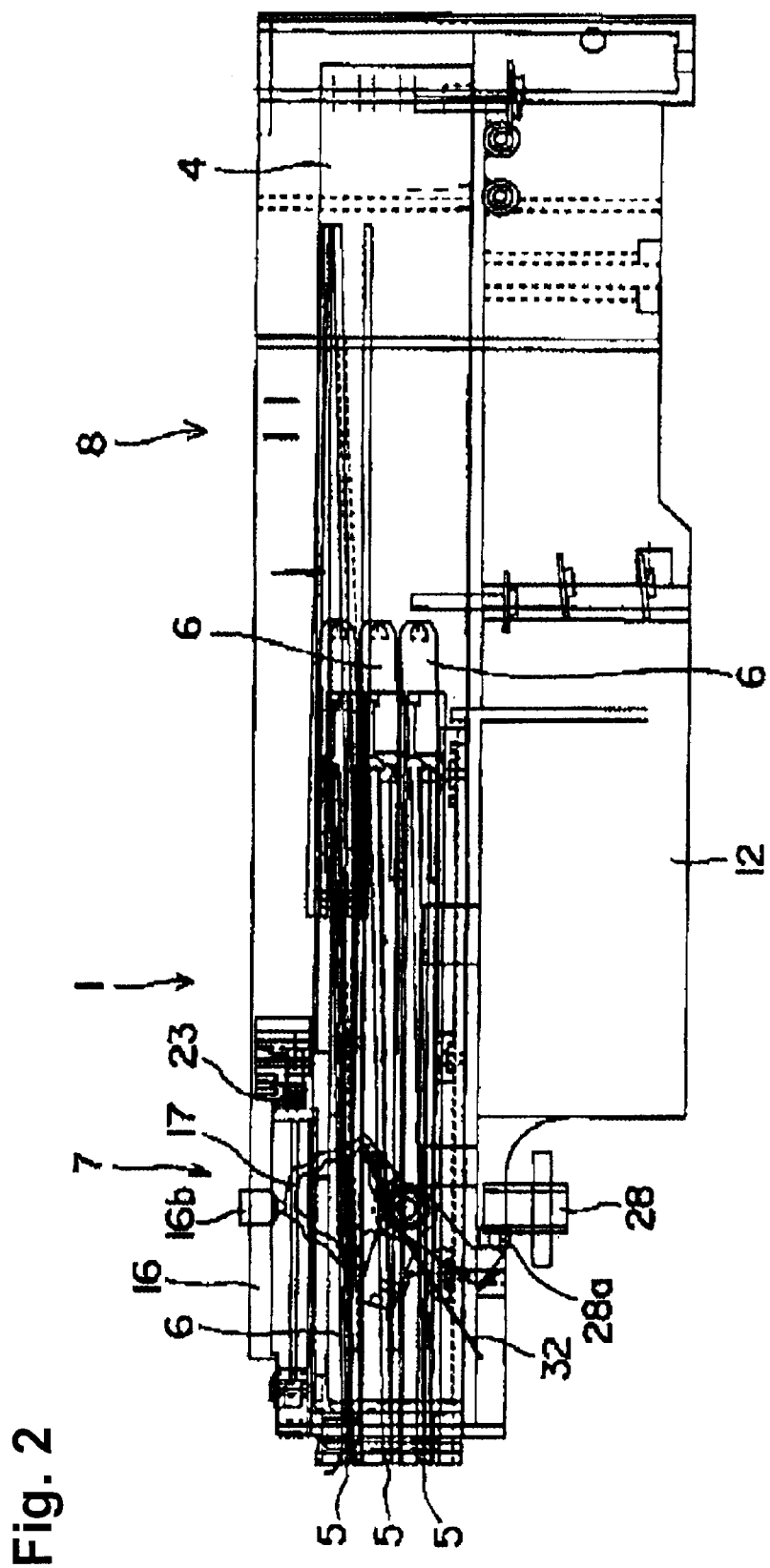
FIG. 2 shows an example of a carriage ejection mechanism in accordance with an embodiment of the present invention, and schematically shows a side view of relative positions of components when carriages are contained in the stock position.
Figure 3:
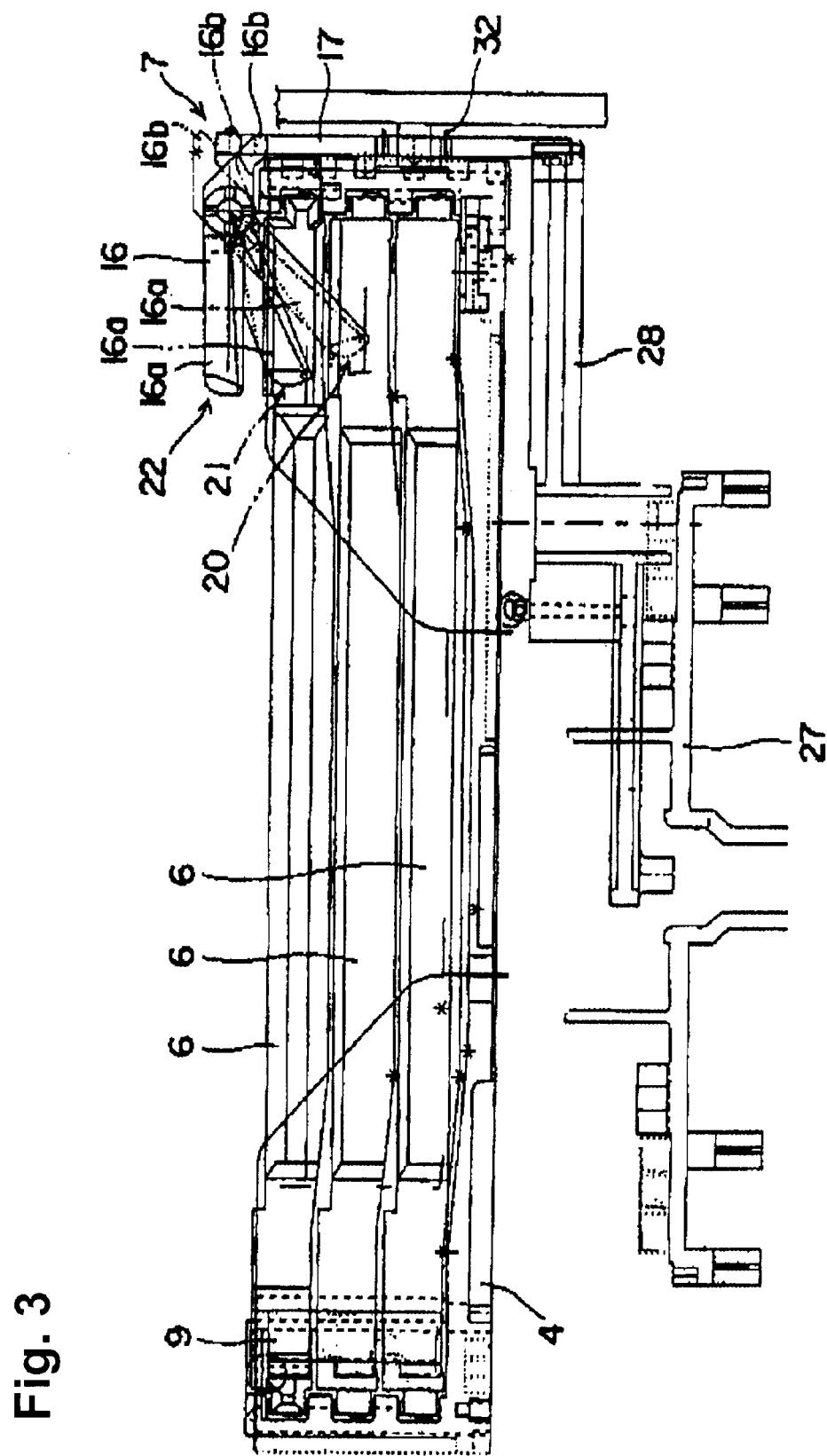
FIG. 3 schematically shows a structure of the relationship between a carriage and a select arm.
Figure 4:
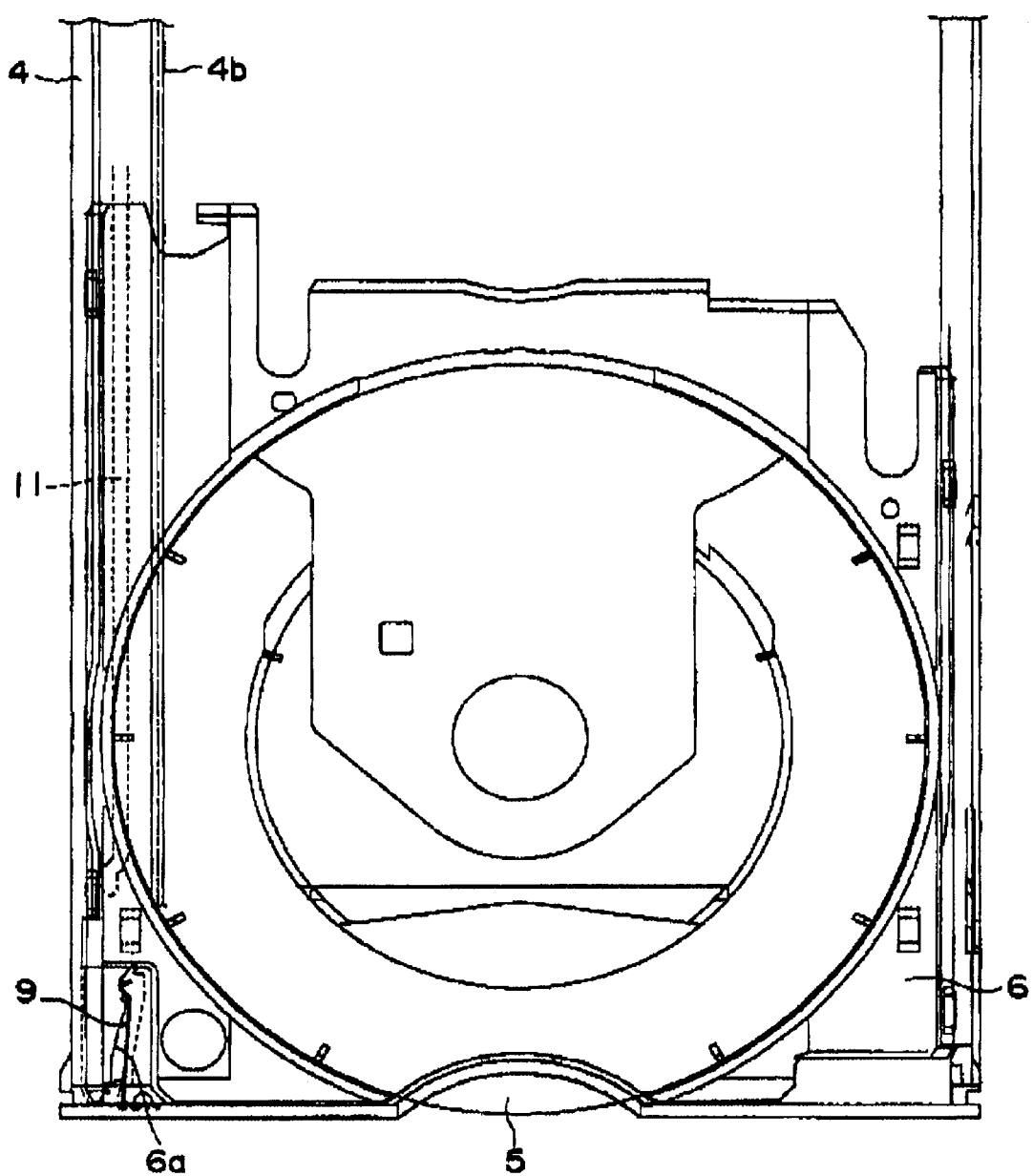
FIG. 4 is a plan view of a carriage retaining device.

Embodiments of the present invention will be described below with reference to the accompanying drawings.

A carriage ejection mechanism, in accordance with an embodiment of the present invention, is shown in FIGS. 1 through 22. This carriage ejection mechanism includes a drawer 4 that moves back and forth between a stock position 1 and eject positions 2 and 3, and a plurality of carriages 6 contained in the drawer 4 and on which discs 5 are placed, where the carriages 6 are ejected successively staggered in a stair-like manner with an eject operation of the drawer 4. In the present embodiment, the carriages 6 are ejected in such a way as to allow at least one of the discs 5 to be viewed in its entirety. There are two eject positions 2 and 3. In the ejection operation of the drawer 4 to the first eject position 2, the ejection operation is accompanied by the carriages 6 ejecting successively staggered in a stair-like manner. In the eject operation of the drawer 4 to the second eject position 3, the ejection operation is accompanied by an ejection of a designated carriage 6 and all carriages 6 below it stacked in a staggered manner. Furthermore, when the drawer 4 is ejected, a plurality of carriages 6 can be manually slid. The first eject position 2 is a position in which the drawer 4 projects out the farthest, while the second eject position 3 is a position with less projection than in the first eject position 2.

For example, the carriage ejection mechanism can be equipped with a drawer 4, which moves back and forth between a stock position 1 and eject positions 2 and 3, a plurality of carriages 6 contained inside the drawer 4 in a slidable manner in the direction the drawer 4 moves and vertically stacked; and a slide control device 7 that slides the carriages 6 towards the stock position 1 relative to the drawer 4 when the drawer 4 moves towards the eject position 2 or 3. The slide control device 7 is structured to slide the upper carriages 6 relatively more towards the stock position 1 than the lower carriages 6, but the amount of slide of the top most (third tier) carriage 6 allows at least a part of the disc 5 on it to be exposed.

In other words, in a disc player comprising the plurality of carriages 6 on which discs 5 are placed and the drawer 4 that contains the plurality of carriages 6 in a slidable manner and that also moves the plurality of carriages 6 outside the device to eject the discs 5, the slide control device 7 is also a carriage retaining mechanism that retains the carriages 6 so that whether all discs 5 are in place can be checked viewed from above when the discs 5 are ejected and when the carriages 6 within the drawer 4 are stacked staggered towards the back of the drawer 4 in sequence from the bottom tier.

Here, a description is made with respect to a disc player on which the carriage ejection mechanism is equipped. The disc player has a plurality of carriages 6 inside its drawer 4, and a plurality of discs 5 can be stocked within the drawer 4 by placing one of the discs 5 on each of the carriages 6. Each of the discs 5 is stocked in the stock position 1. When playing one of the discs 5, the carriage 6 with the disc 5 to be played is carried from the stock position 1 to a disc play position 8. To eject one of the discs 5, the drawer 4 along with the carriages 6 are moved into the eject position 2 or 3.

In the present embodiment, there are two eject positions, the first eject position 2 and the second eject position 3. In addition, there are three carriages 6. However, needless to say the number of the carriages 6 is not limited to three.

On the inner surface on the left and right walls of the drawer 4 are formed guide grooves 4a that guide the three carriages 6. The carriages 6 are fit into the guide grooves 4a (FIG. 17) in a slidable manner and are movable in the direction the drawer 4 moves, i.e., movable towards and away from the stock position 1 when the drawer 4 projects out (is carried).

A carriage retaining device 9 is attached on the inner surface of the left part of the frontal wall of the drawer 4, which for instance can be formed form leaf springs. In the meantime, on the part of each of the carriages 6 that opposes the corresponding carriage retaining device 9 is formed a concave section 6a. Accordingly, when one of the carriages 6 moves to a position most forward within the drawer 4, the respective carriage retaining device 9 undergoes elastic deformation and fits into the corresponding concave section 6a and thereby retains the carriage 6 with a light force. The retaining force provided by the carriage retaining device 9 is small, so that, as described later, when the drawer 4 is moved while any of the carriages 6 is retained by the slide control device 7, the carriage retaining device 9 becomes easily dislocated from the corresponding carriage 6. The carriage retaining device 9 also becomes easily removed from the corresponding carriage 6 when that carriage 6 is manually slid.

A rack 4b is provided on the lower surface of the bottom plate of the drawer 4. The rack 4b is formed along the direction the drawer 4 moves. The rack 4b engages an eject gear 10. Accordingly, turning the eject gear 10 drives the drawer 4 and moves the drawer 4 back and forth between the stock position 1 and the first eject position 2 or the second eject position 3.

Also, a position sensor cam groove 11 is formed on the lower surface of the bottom plate of the drawer 4 alongside the rack 4b. The position sensor cam groove 11 has five linear sections 11a–11e. On the position sensor cam groove 11 is fitted in a freely slidable manner one end of a position sensor lever 13 that is attached to a chassis 12 in a freely swingable manner. Consequently, when the drawer 4 moves and one end of the position sensor lever 13 slides within the position sensor cam groove 11, the position sensor lever 13 swings whenever one end of the position sensor lever 13 moves from one part the linear sections 11a–11e that it is sliding through to another part of the linear sections 11a–11e. On the other end of the position sensor lever 13, there is provided a protruding piece 13a that turns on and off switches 14 and 15. Moving positions of the drawer 4 can be detected by having a pair of switches 14 and 15 detect the swing of the position sensor lever 13.

The slide control device 7 comprises a select arm 16 that retains the selected carriage 6, a select lever 17 that operates the select arm 16, and a control groove 18 and a control cam 19 that operate the select lever 17.

The select arm 16 is placed facing upward on the right wall of the drawer 4 when the drawer 4 is retracted, and is attached in a swingable manner to the chassis 12. A tip 16a of the select arm 16 extends towards the front of the second tier (second from the bottom) carriage 6 or the third tier (top tier) carriage 6 within the drawer 4 when the drawer 4 is retracted.

Accordingly, in these states, the tip 16a of the select arm 16 retains the second tier carriage 6 and/or the third tier carriage 6. On the other hand, when the select arm 16 swings and its tip 16a is raised higher than the third tier carriage 6, the retaining on all carriages 6 is released. In other words, the select arm 16 can swing among a second tier retaining position 20 (a position indicated by 20 in FIG. 3) that retains the second and third tier carriages 6, a third tier retaining position 21 (a position indicated by 21 in FIG. 3) that retains only the third tier carriage 6, and a neutral position 22 (a position indicated by 22 in FIG. 3) that retains none of the carriages 6. The select arm 16 is normally forced by a return spring 23 in the direction to raise the tip 16a of the select arm 16.

The select lever 17 is placed below the select arm 16, i.e., facing the right wall of the drawer 4 in retracted state, and is attached to the chassis 12 in a swingable manner. The select lever 17 is formed by a cam surface 17a that operates the select arm 16, a first arm 17b that is operated by the control groove 18, and a second arm 17c that is operated by the control cam 19.

The cam surface 17a comprises a second tier retaining area 24 that raises a follower segment 16b of the select arm 16 the highest to swing the tip 16a into the second tier retaining position 20, third tier retaining areas 25L and 25R that raise the follower segment 16b of the select arm 16 to the second highest position to swing the tip 16a into the third tier retaining position 21, and neutral areas 26L and 26R that raise the follower segment 16b of the select arm 16 to the lowest position to swing the tip 16a into the neutral position 22. The third tier retaining areas 25 and the neutral areas 26 are on either side of the second tier retaining area 24.

The control groove 18 that operates the first arm 17b is formed on the outer surface of the right wall of the drawer 4. The control groove 18 has first through third linear sections 18a–18c, such that when the first arm 17b of the select lever 17 slides in the first linear section 18a the second tier retaining area 24 of the cam surface swings the select arm 16 into the second tier retaining position 20. Further, when the first arm 17b of the select lever 17 slides in the second linear section 18b, the third tier retaining area 25L of the cam surface 17a swings the select arm 16 into the third tier retaining position 21. Moreover, when the first arm 17b of the select lever 17 slides in the third linear section 18c, the neutral area 26L of the cam surface 17a swings the select arm 16 into the neutral position 22.

Figure 11:
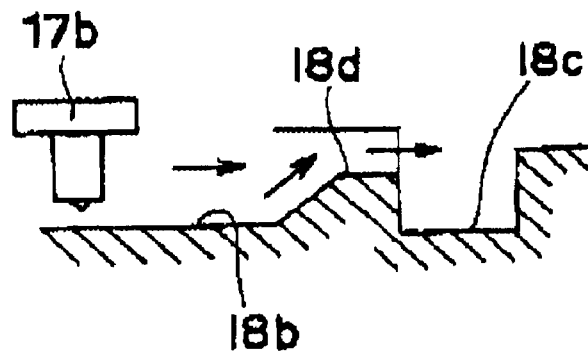
FIG. 11 is a cross-sectional view of an incline section between a second linear section and a third linear section of a control groove.
Figure 12:
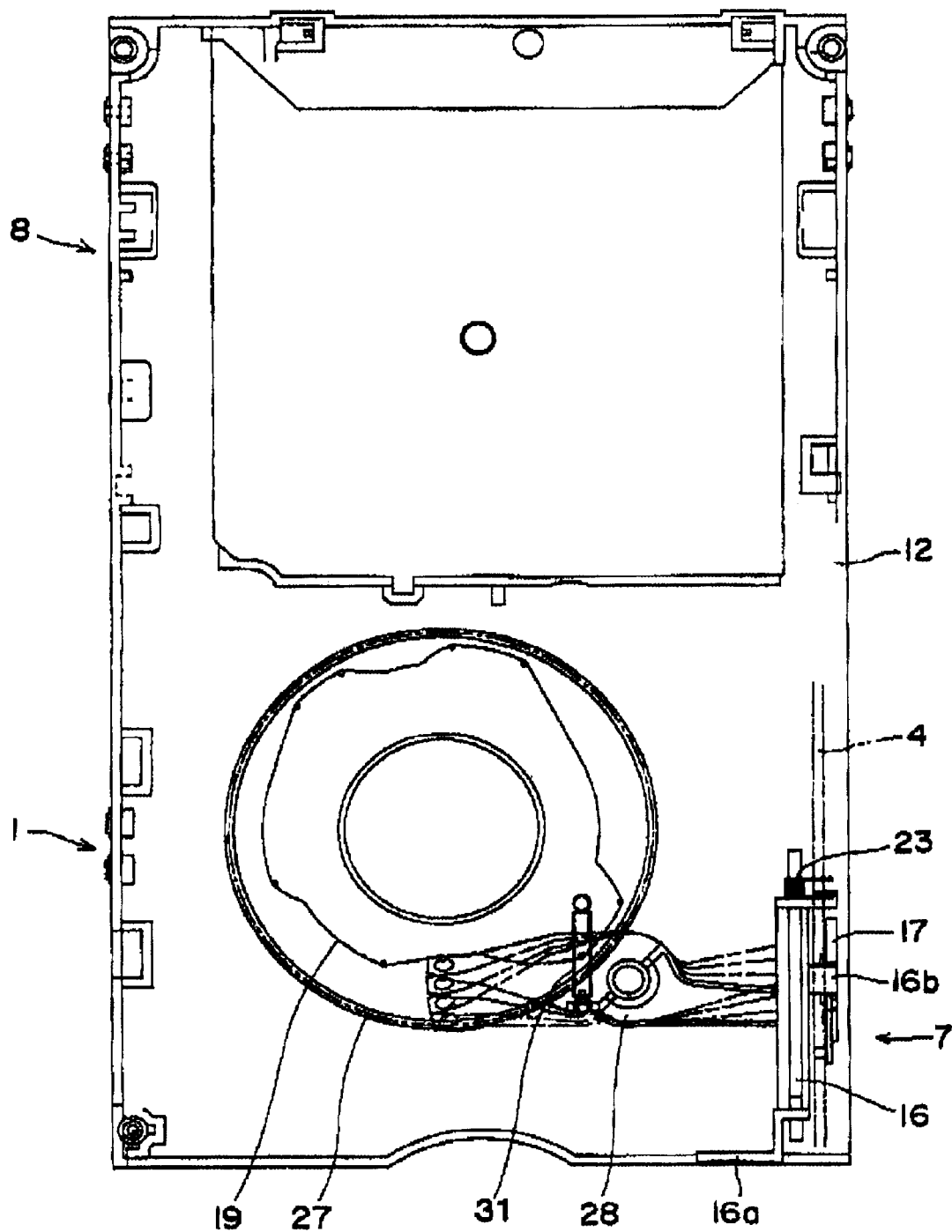
FIG. 12 shows a plan view of relative positions of a control cam and an operating lever.
Figure 13:
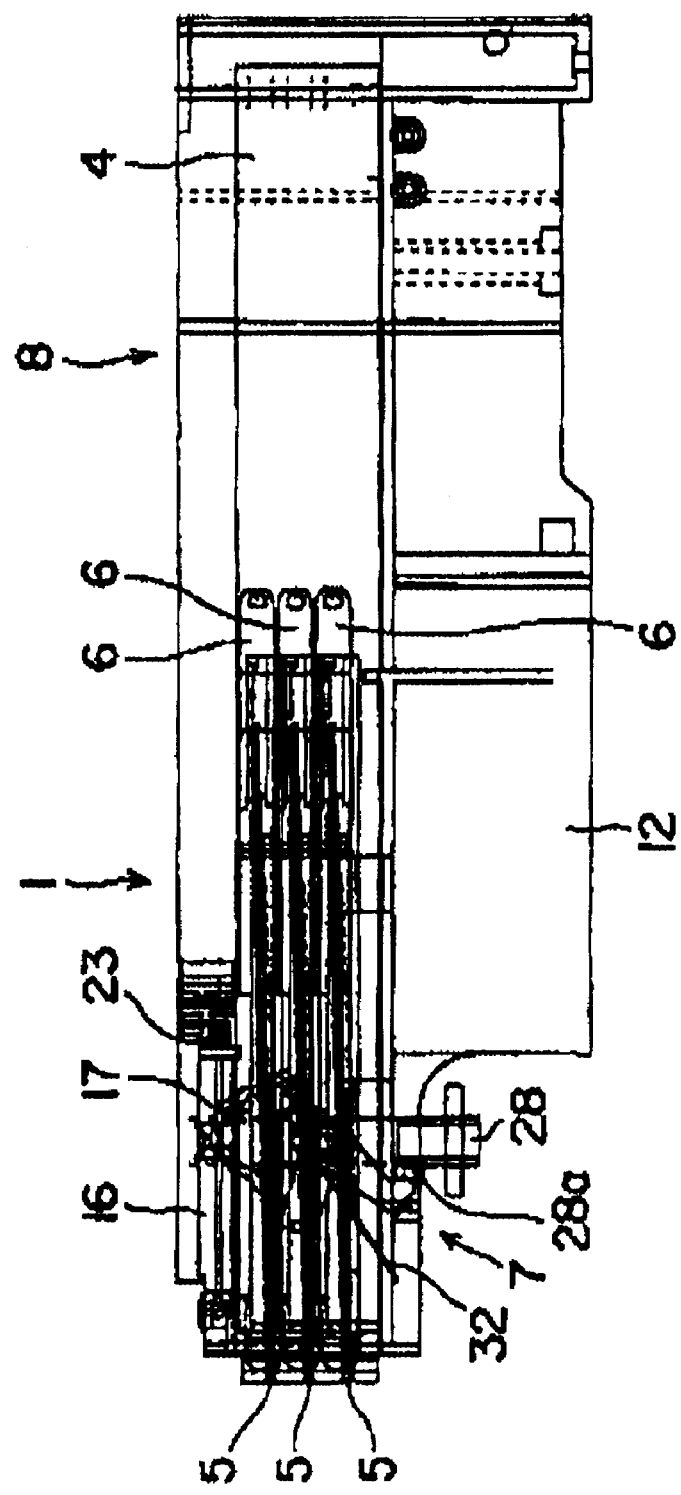
FIG. 13 shows an eject operation in an all eject mode, which shows the relative positions of components before the carriages are ejected.
Figure 14:
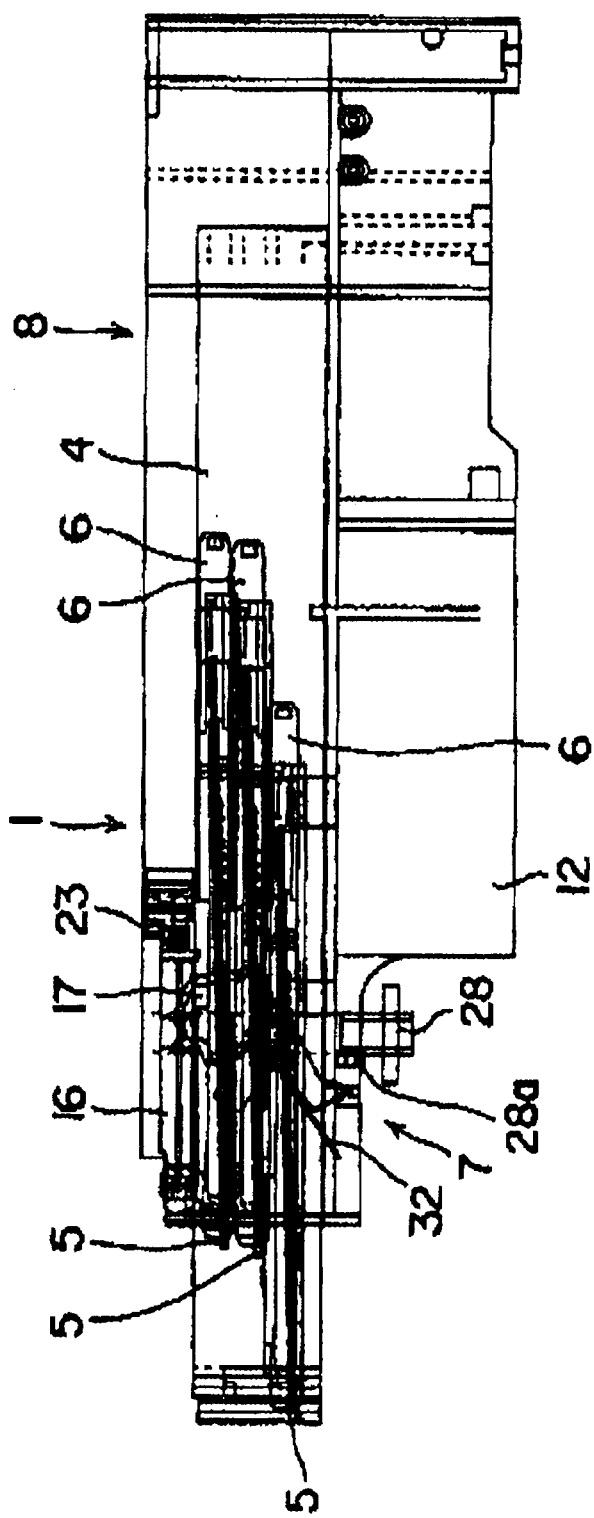
FIG. 14 shows the eject operation in the all eject mode, which shows the relative positions of components following the state shown in FIG. 13.
Figure 15:
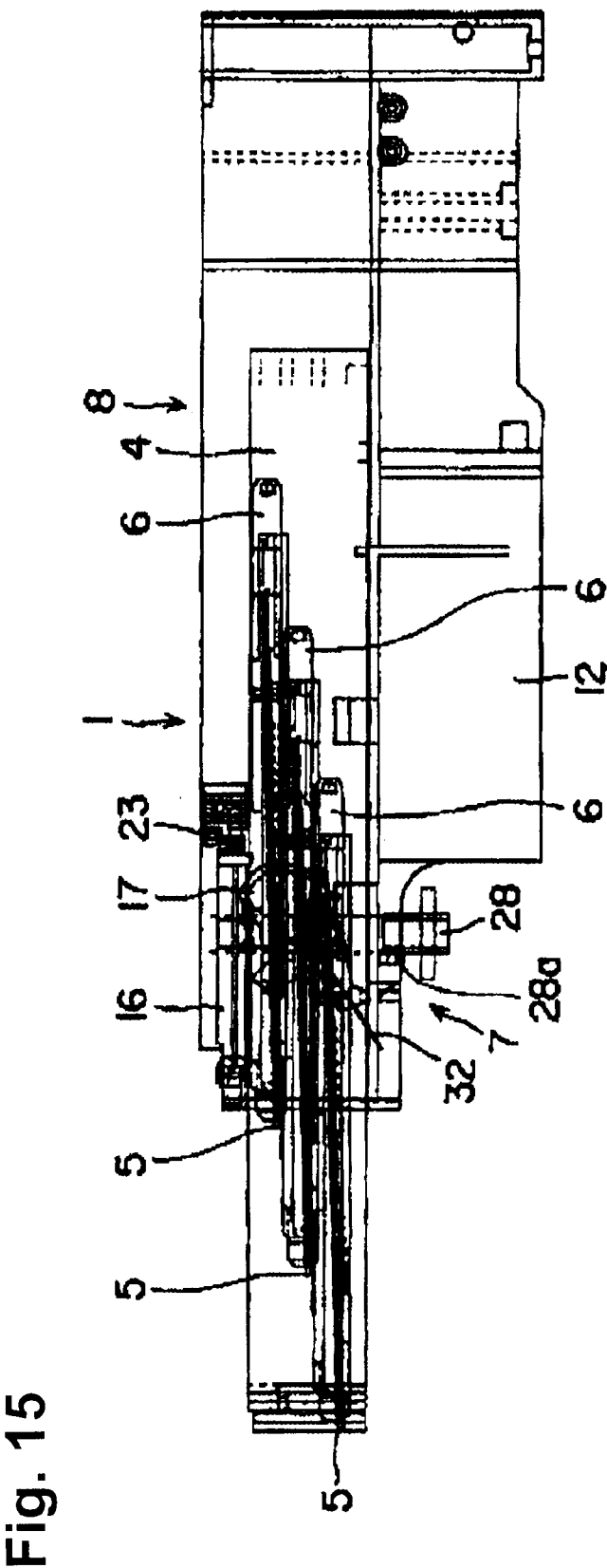
FIG. 15 shows the eject operation in the all eject mode, which shows the relative positions of components following the state shown in FIG. 14.
Figure 16:
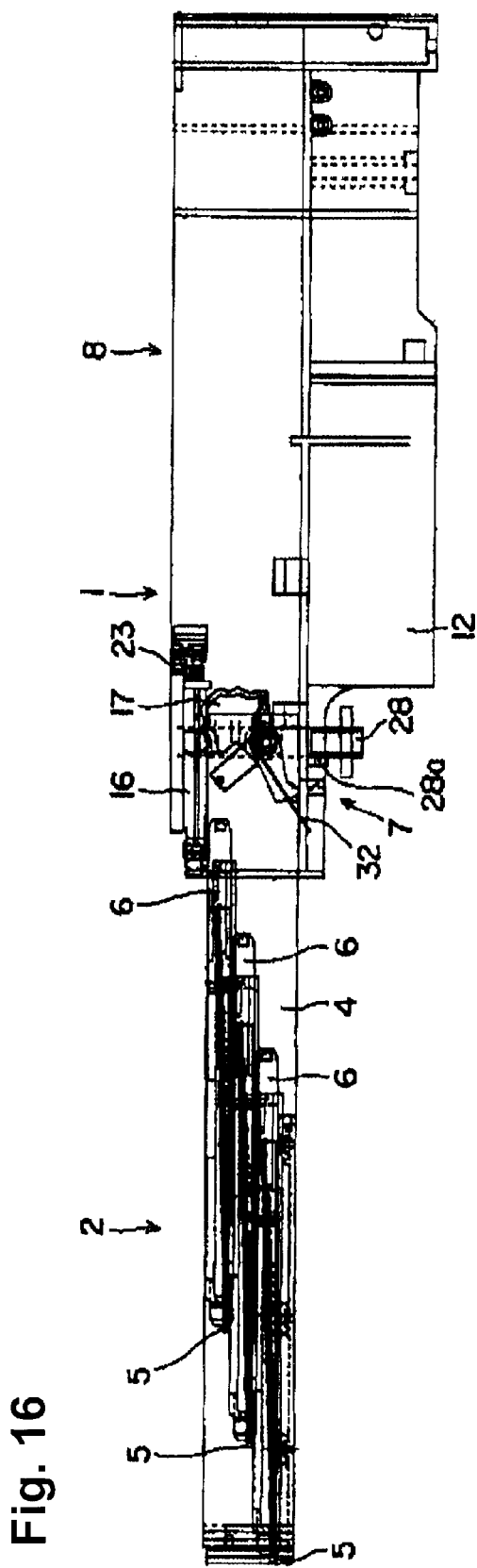
FIG. 16 shows the eject operation in the all eject mode, which shows the relative positions of components upon completing the eject operation.
Figure 17:
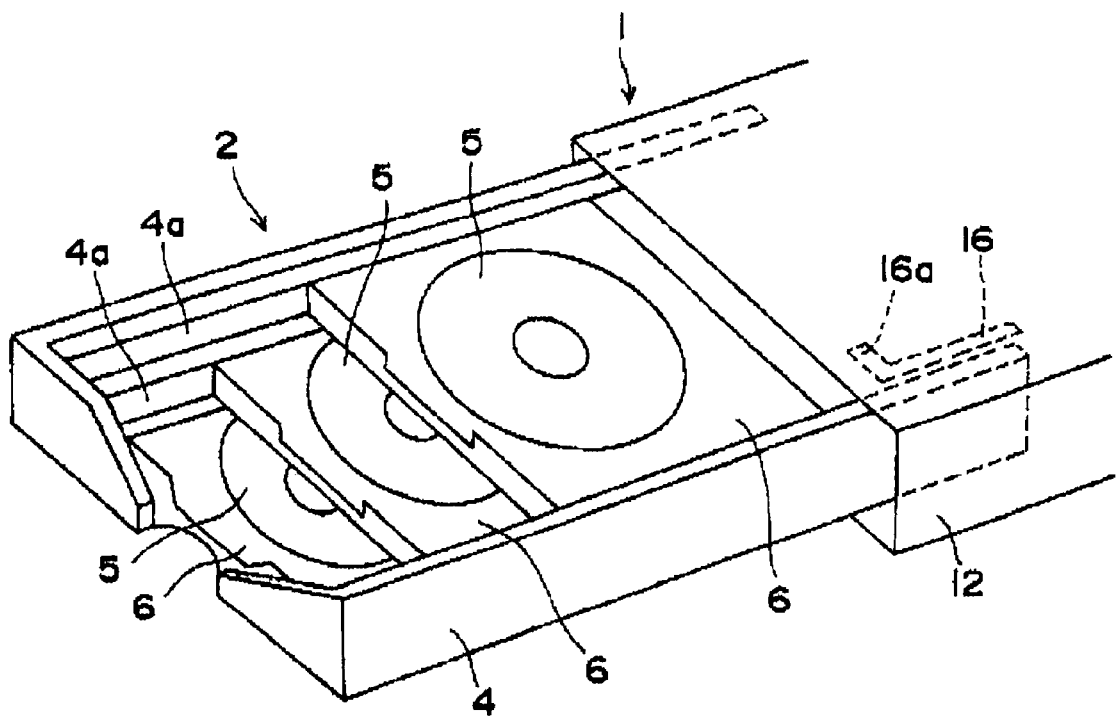
FIG. 17 shows the carriages pulled out in the all eject mode.
Figure 18:
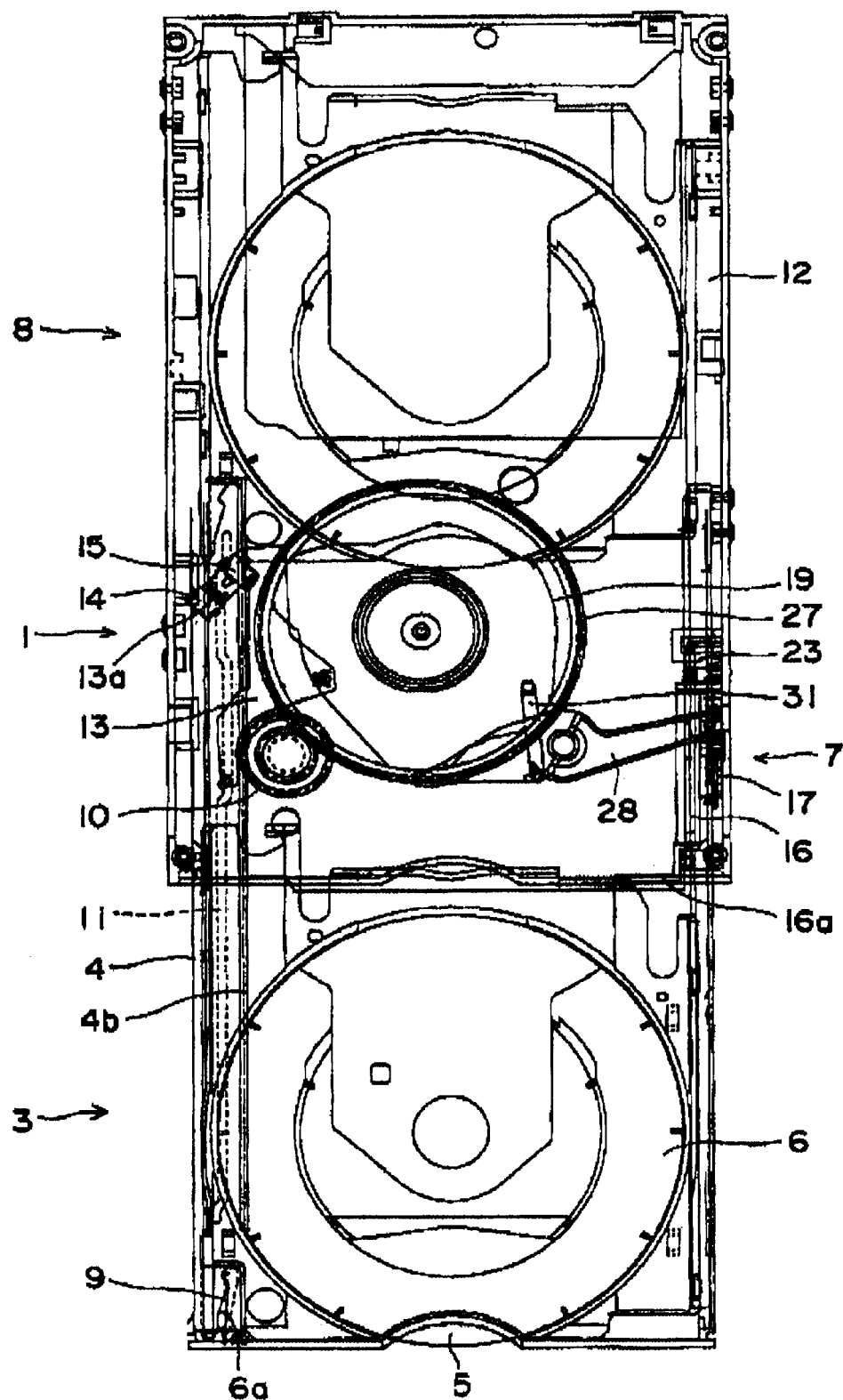
FIG. 18 is a plan view showing a carriage pulled out in an individual eject mode and also showing the relative positions of components.
Figure 19:
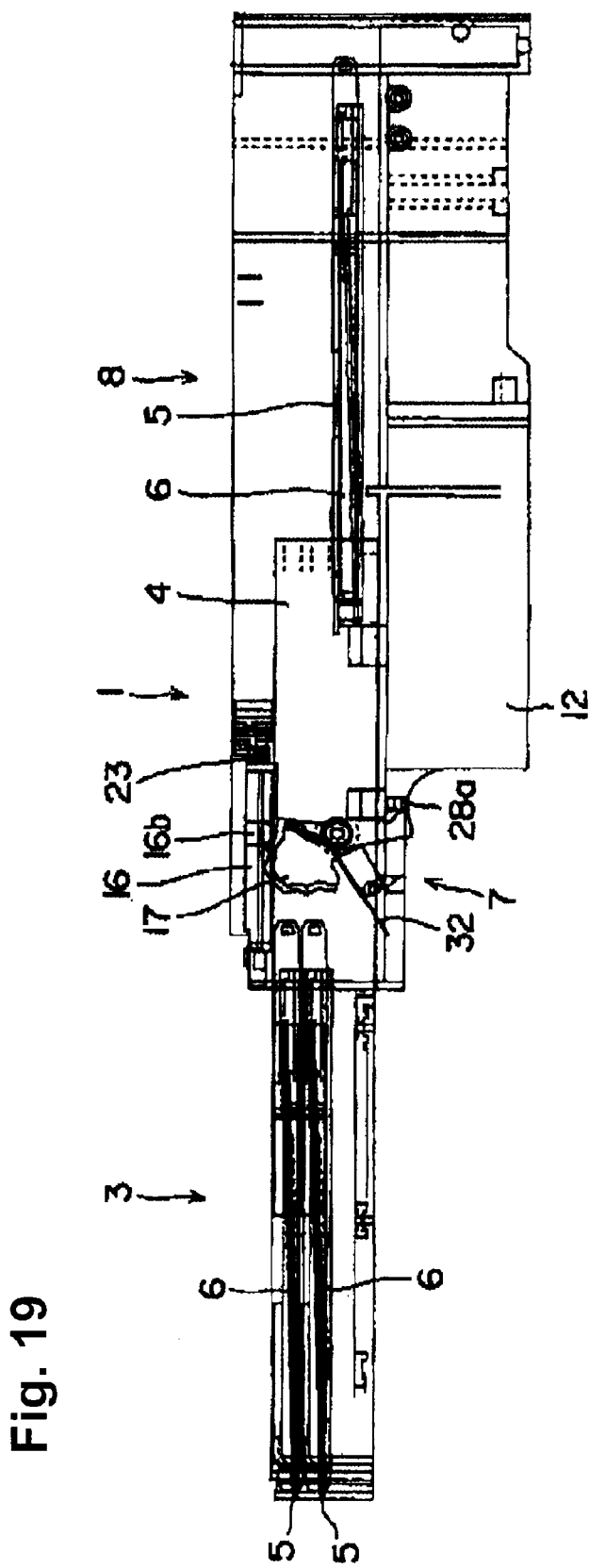
FIG. 19 is a side view showing the relative positions of components when carriages are pulled out in the individual eject mode and also of a state in which the third tier disc has been designated for ejection while the first tier disc is being played.

FIG. 11 shows a cross-section of an incline section 18d between the second linear section 18b and the third linear section 18c. The groove in the incline section 18d is more shallow than the groove in the second linear section 18b or the third linear section 18c, and while the second linear section 18b is connected to the incline section 18d by a slope, there is a height difference between the third linear section 18c and the incline section 18d. Consequently, although the first arm 17b can go from the second linear section 18b over the incline section 18d, it cannot go over the incline section 18d from the third linear section 18c. As a result, the first arm 17b can proceed from the second linear section 18b to the third linear section 18c but cannot go backwards from the third linear section 18c to the second linear section 18b.

The control cam 19 that operates the second arm 17c of the select lever 17 is formed on a cam gear 27 that is provided in a freely rotatable manner on the bottom plate of the chassis 12. When the cam gear 27 rotates, the control cam 19 causes an operating lever 28 to swing, and the swing of the operating lever 28 causes its tip 28a to operate the second arm 17c of the select lever 17. Through operations of the control cam 19, the second tier retaining area 24, the neutral area 26R or the third tier retaining area 25R of the cam 17a of the select lever 17 selectively swings the select arm 16.

The operating lever 28 is normally pressed against the control cam 19 by a return spring 31. The second arm 17c of the select lever 17 is normally pressed against the tip 28a of the operating lever 28 by a return spring 32.

The carriage ejection mechanism has an individual ejection device that keeps in the stock position 1 all of the carriages 6 above the designated carriage 6 when the drawer 4 moves to the eject position 2 or 3. In the present embodiment, the individual ejection device is realized by the slide control device 7. In other words, the slide control device 7 also functions as the individual ejection device.

Next, a description is made with respect to the operation of a carriage ejection mechanism. The carriage ejection mechanism has an all eject mode in which all discs 5 are ejected slightly staggered in a stair-like manner, and an individual eject mode in which the designated disc 5 is ejected. In the all eject mode, the disc 5 being played is stopped and ejected along with other discs 5. On the other hand in the individual eject mode, only discs 5 stocked in the stock position 1 other than the disc 5 being played are ejected. In the individual eject mode, the designated disc 5 and all discs 5 below are ejected together. In other words, in the individual eject mode the discs 5 are ejected with the designated disc 5 as the top most disc 5.

First, the all eject mode is described. In this mode, the select lever 17 is operated by the control groove 18. The drawer 4 is carried to the first eject position 2.

When the user selects the all eject mode, the cam gear 27 is caused to rotate by a motor (omitted from drawings). This causes the control cam 19 to rotate and to control the select lever 17 via the operating lever 28. Since the all eject mode is selected, the control cam 19 swings the select lever 17 to a position where the second tier retaining area 24 of the cam surface 17a operates the follower segment 16b of the select arm 16. In this position, the first arm 17b of the select lever 17 faces the first linear section 18a of the control groove 18.

If one of the discs 5 is being played, the play is halted and the corresponding carriage 6 is returned from the disc play position 8 to the stock position 1. In other words, all discs 5 are returned to the stock position 1.

In this state, the motor (omitted from drawings) causes the eject gear 10 to rotate and the drawer 4 is moved towards the first eject position 2. With the movement of the drawer 4, the control groove 18 formed on the right wall of the drawer 4 moves along the select lever 17, which causes the first arm 17b of the select lever 17 to operate in accordance with the shape of the control groove 18.

The first arm 17b slides along the control groove 18 in the order of the first linear section 18a, the second linear section 18b and the third linear section 18c. Accordingly, the cam surface 17a of the select lever 17 operates the select arm 16 in the order of the second tier retaining area 24, the third tier retaining area 25L and the neutral area 26L. This results in the select arm 16 being swung in the order of the second tier retaining position 20, the third tier retaining position 21 and the neutral position 22. Because each of the linear sections 18a–18c of the control groove 18 has a certain length, the select arm 16 stops at each of the positions 20 and 21 before moving onto the respective next positions 21 and 22. In other words, the select arm 16 is operated intermittently. Since the control groove 18 operates in such a way that the second arm 17c swings the select lever 17 away from the tip 28a of the operating lever 28, the control cam 19 does not hinder operations by the control groove 18.

At the second tier retaining position 20, which is the first stop, the select arm 16 retains the carriages 6 for the second and third tiers, which allows only the first tier (the bottom) carriage 6 to be pulled out with the drawer 4. In other words, because the select arm 16 causes the carriages 6 for the second and third tiers to slide relative to the drawer 4, which is moving, the result is that the carriages 6 for the second and third tiers are not pulled out and only the first tier carriage 6 is pulled out with the drawer 4. The first tier carriage 6 moves retained to the drawer 4 by the carriage retaining device 9. In the meantime, the carriages 6 for the first and second tiers are released from the carriage retaining device 9 through their movement relative to the drawer 4.

At the third tier retaining position 21, the next stop, the select arm 16 retains only the third tier carriage 6, so that in addition to the first tier carriage 6, the second tier carriage 6 is also pulled out along with the drawer 4. In other words, because the select arm 16 causes the third tier carriage 6 to slide relative to the drawer 4, which is moving, the result is that the third tier carriage 6 is not pulled out and the carriages 6 for the first and second tiers are pulled out with the drawer 4. The second tier carriage 6 is pulled out with the drawer 4 by the friction between it and the drawer 4.

At the neutral position 22, the last stop, the select arm 16 retains none of the carriages 6, so that in addition to the carriages 6 for the first and second tiers, the third tier carriage 6 is also pulled out with the drawer 4. The third tier carriage 6 is pulled out with the drawer 4 by the friction between it and the drawer 4.

In this way, the intermittent movement of the select arm 16 from the second tier retaining position 20 to the third tier retaining position 21 and onto the neutral position 22 takes place while the drawer 4 moves. As a result, the three carriages 6 are pulled out slightly staggered in sequence from the bottom in a stair-like manner.

Figure 7:
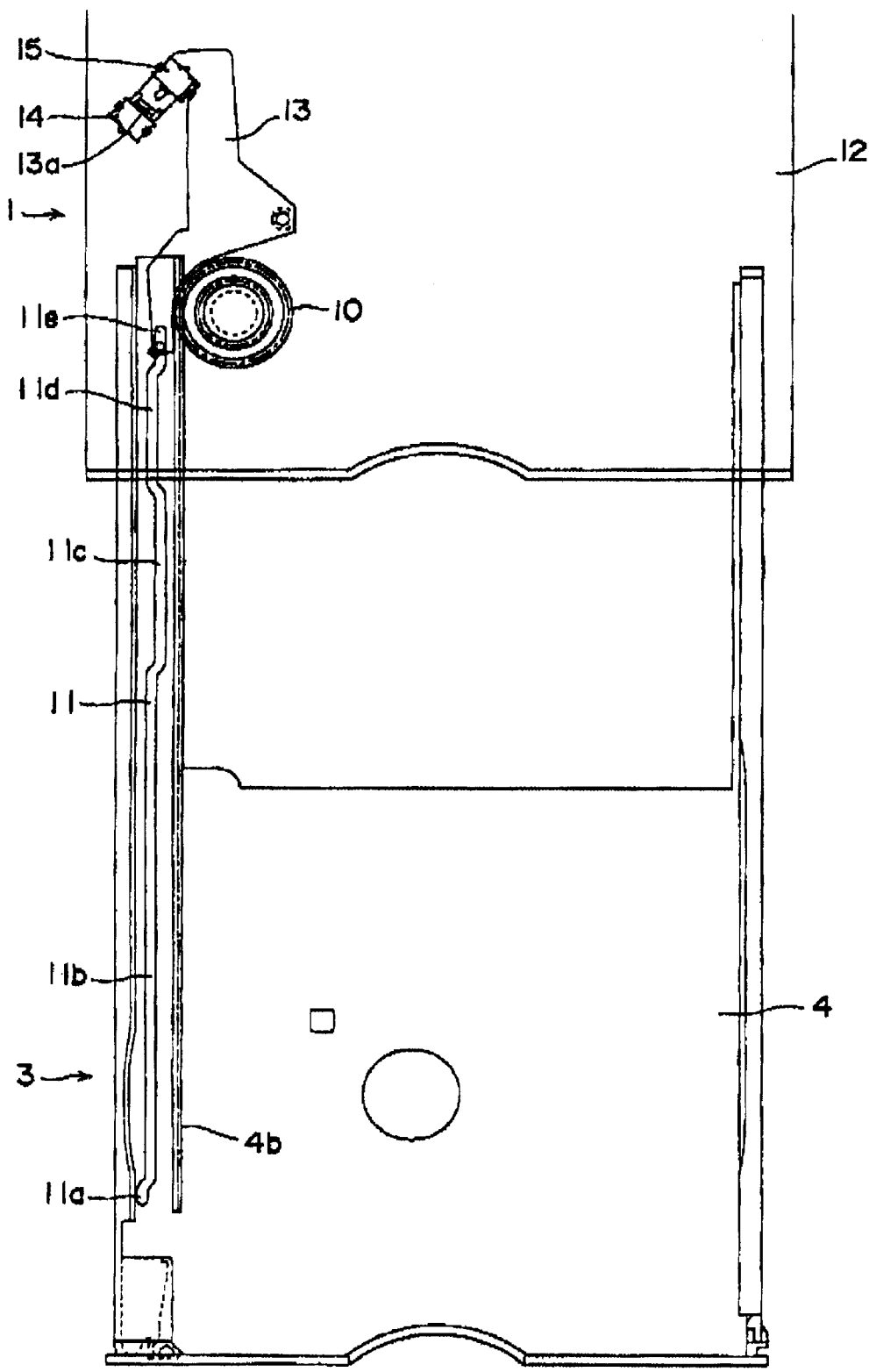
FIG. 7 is a plan view showing the relative positions of components when the drawer has moved to the first eject position.
Figure 8:
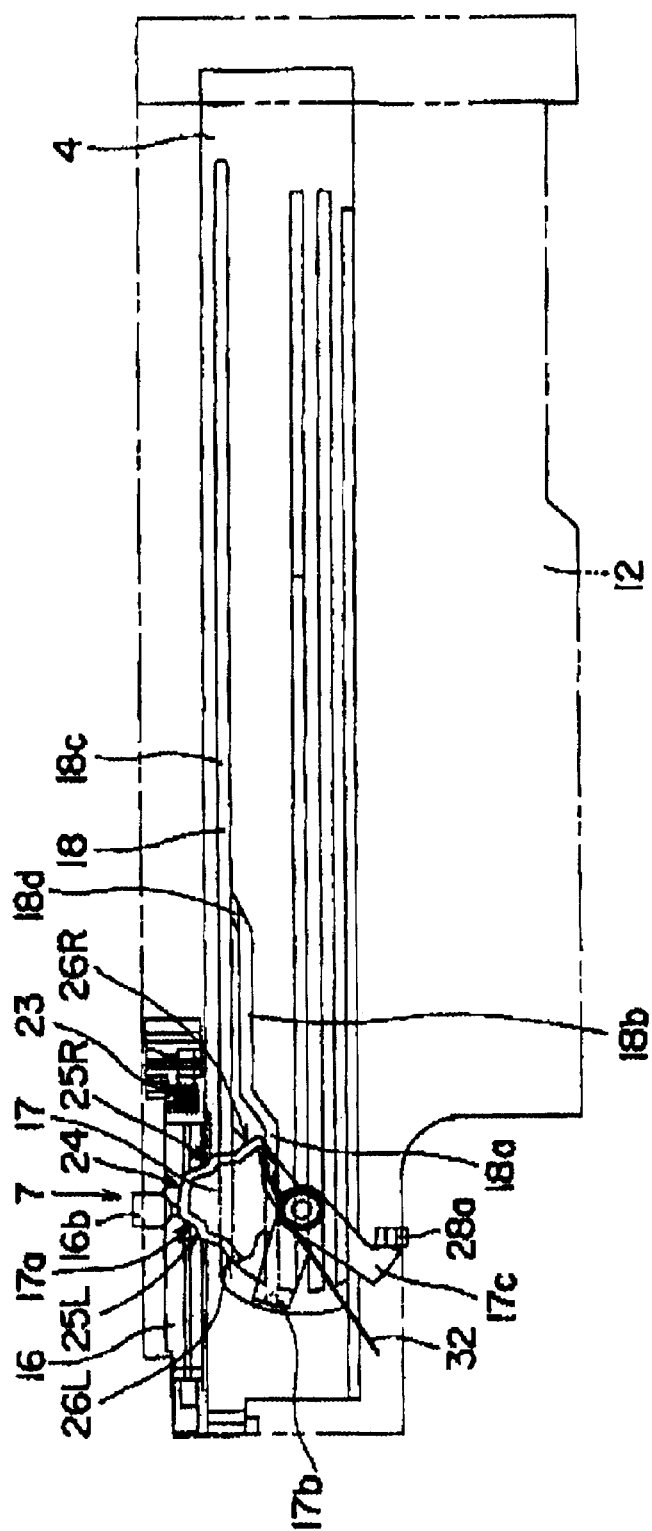
FIG. 8 is side view showing the relationship between a select bar and a control groove.

When the top carriage 6 is pulled out to a position that completely exposes the disc 5 placed on it, i.e., a top mounting area of the top carriage 6 that holds the disc 5 is generally entirely exposed. In other words, when the drawer 4 is pulled out to the first eject position 2, one end of the position sensor lever 13 moves from the fourth linear section 11d to the fifth linear section 11e of the position sensor cam groove 11 (FIG. 7). When this movement is detected by the switch 14, the motor stops the drive of the eject gear 10 and the drawer 4 stops.

The carriages 6 can be pulled out slightly staggered in sequence from the bottom in a stair-like manner in this way in the carriage ejection mechanism according to the present invention, which allows all discs 5 in stock to be checked all at once.

Figure 22:
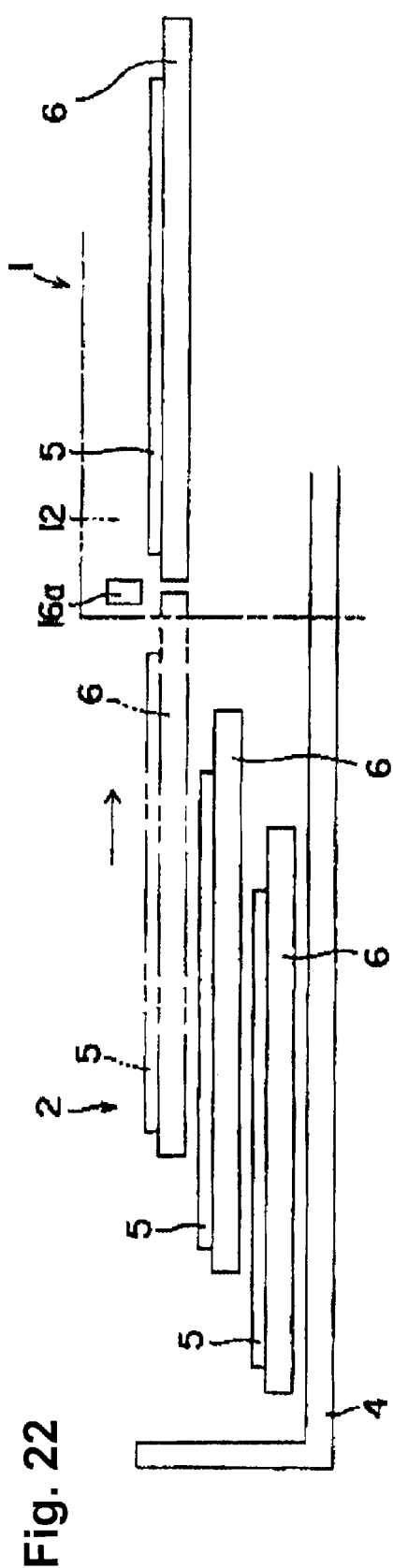
FIG. 22 schematically shows a manual sliding operation for the third tier carriage when an eject operation takes place in the all eject mode.

Here, the top (third tier) carriage 6 is pulled out to a position that completely exposes its disc mounting top surface on which the disc 5 is placed. Consequently, the disc 5 on the top carriage 6 can be replaced in this state. Furthermore, as shown in FIG. 22, manually sliding the top carriage 6 from this state into the main body completely exposes the disc 5 on the second tier carriage 6. As a result, the disc 5 on the second tier carriage 6 can be replaced. Moreover, manually sliding the second tier carriage 6 into the main body completely exposes the disc 5 on the bottom (first tier) carriage 6. This allows the disc 5 on the bottom carriage 6 to be replaced.

To return the drawer 4 to the stock position 1 after replacing the discs 5, the motor must be rotated in reverse and the eject gear 10 rotated in reverse. The reverse rotation of the eject gear 10 causes the drawer 4 to be returned towards the stock position 1. While the drawer 4 is being returned to the stock position 1, the first arm 17b of the select lever 17 slides along the third linear section 18c of the control groove 18. Accordingly, the select arm 16 is raised to the neutral position 22, which is a position in which the select arm 16 poses no interference with the top carriage 6 that moves with the drawer 4 and therefore a position that prevents any damage to the top carriage 6.

Figure 5:
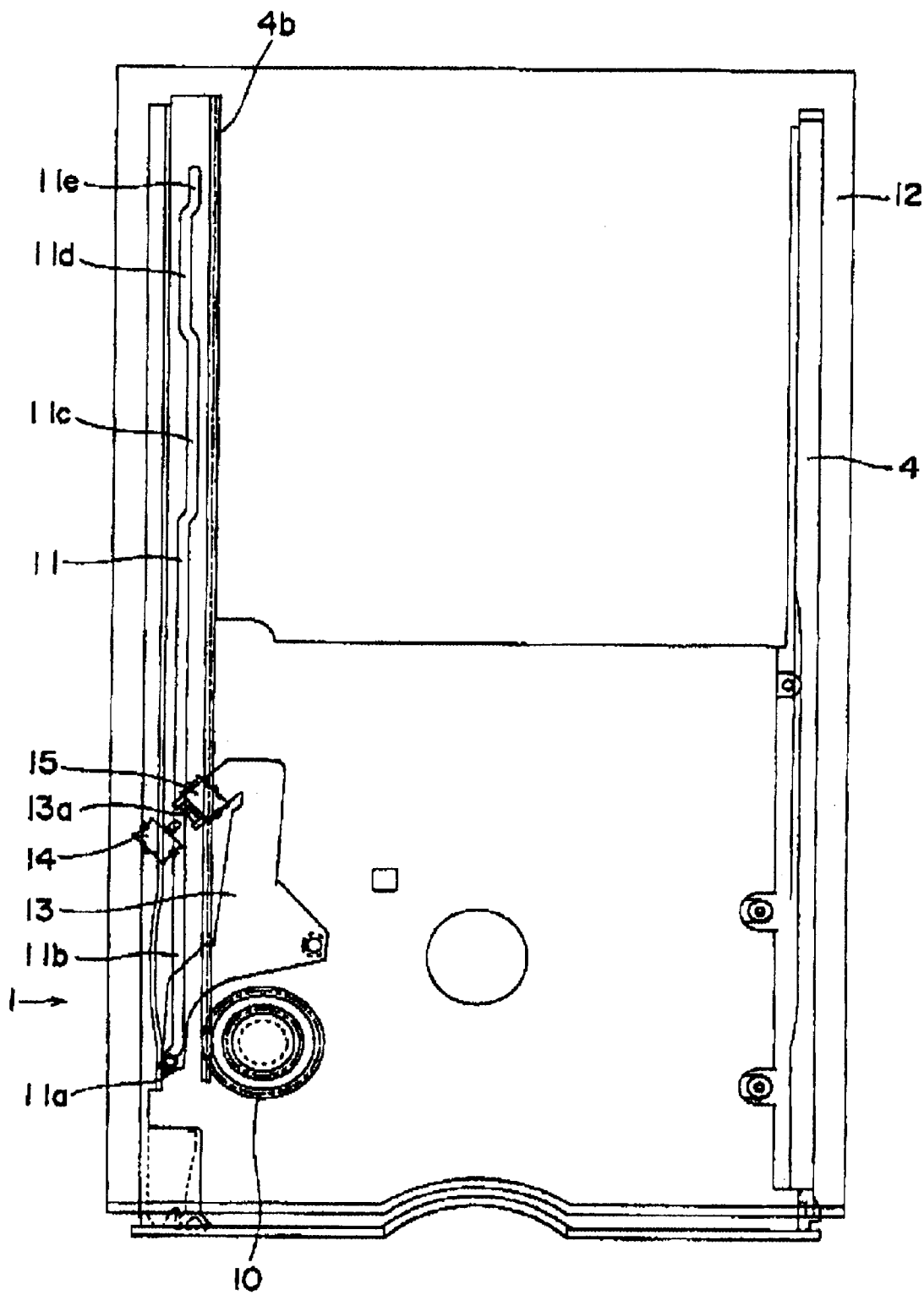
FIG. 5 is a plan view showing the relative positions of components when the drawer has moved to the stock position.

When the drawer 4 has moved to the stock position 1, one end of the position sensor lever 13 moves from the second linear section 11b to the first linear section 11a of the position sensor cam groove 11 (FIG. 5). When the switch 15 detects this movement, the motor stops the drive of the eject gear 10 and causes the drawer 4 to stop.

Next, the individual eject mode is described. In this mode, the control cam 19 operates the select lever 17. Here, a description is made as to an example in which the disc 5 on the third tier carriage 6 is ejected while the disc 5 on the first tier carriage 6 is being played. The motor causes the cam gear 27 to rotate to operate the control cam 19, and the select lever 17 is swung via the operating lever 28 to the position shown in FIG. 10.

In this position, the neutral area 26L of the cam surface 17a of the select lever 17 operates the select arm 16, and consequently the select arm 16 swings into the neutral position 22.

In this state, the eject gear 10 is driven and the drawer 4 is moved towards the second eject position 3. Since the first arm 17b of the select lever 17 passes under the control groove 18, the select lever 17 is not operated by the control groove 18. Consequently, the select arm 16 remains in the neutral position 22 and does not retain any of the carriages 6. This causes all of the carriages 6 in the stock position 1, in this example the carriages 6 for the second and third tiers, to be pulled out with the drawer 4. In other words, excepting the first tier carriage 6 that has moved into the disc play position 8, the third tier carriage 6 that was designated for ejection and the second tier carriage 6 below it are pulled out in a stack.

Figure 6:
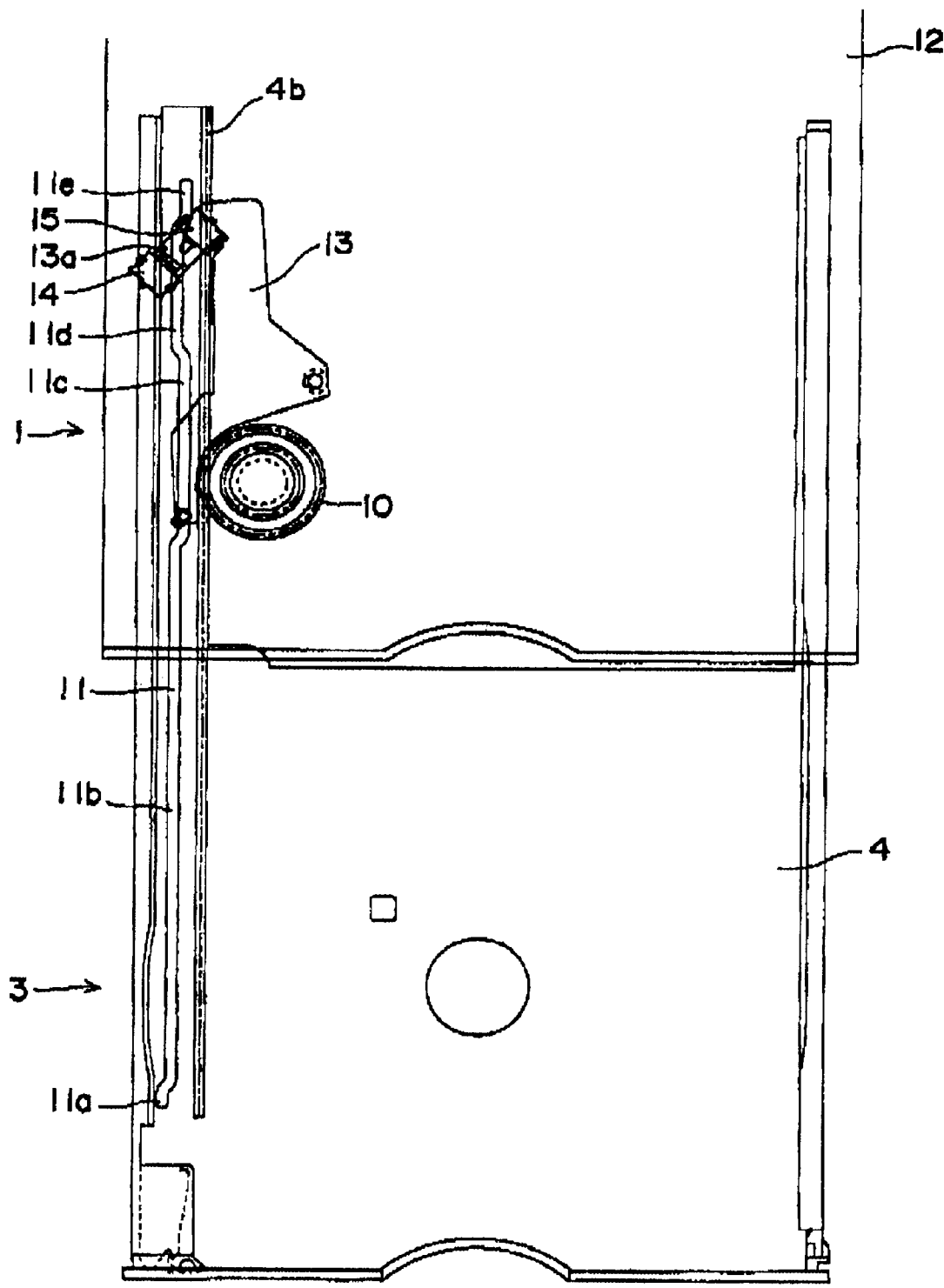
FIG. 6 is a plan view showing the relative positions of components when the drawer has moved to the second eject position.

In this mode, the drawer 4 is pulled out to the second eject position 3, which is enough to fully expose one disc 5 on one of the carriages 6. When the drawer 4 moves to the second eject position 3, one end of the position sensor lever 13 moves from the second linear section 11b to the third linear section 11c of the position sensor cam groove 11 (FIG. 6). A controller (not shown) detects this movement through the switch 14 and turns off the motor to stop the drawer 4.

To return the drawer 4 to the stock position 1 after replacing the disc 5, the motor must be rotated in reverse such that the eject gear 10 rotated in reverse. The reverse rotation of the eject gear 10 causes the drawer 4 to move towards the stock position 1. Since the select arm 16 remains in the neutral position 22, it does not pose any interference with the top carriage 6 while the drawer 4 moves. When the drawer 4 reaches the stock position 1, the position sensor lever 13 moves from the second linear section 11b to the first linear section 11a of the position sensor cam groove 11. When the switch 15 detects this movement, the motor stops the drive of the eject gear 10 and causes the drawer 4 to stop.

In this case, since the disc 5 on the second tier carriage 6 is pulled out along with the third tier carriage 6 during ejection, the disc 5 on the second tier carriage 6 can be replaced by manually sliding back the third tier carriage 6.

Figure 20:
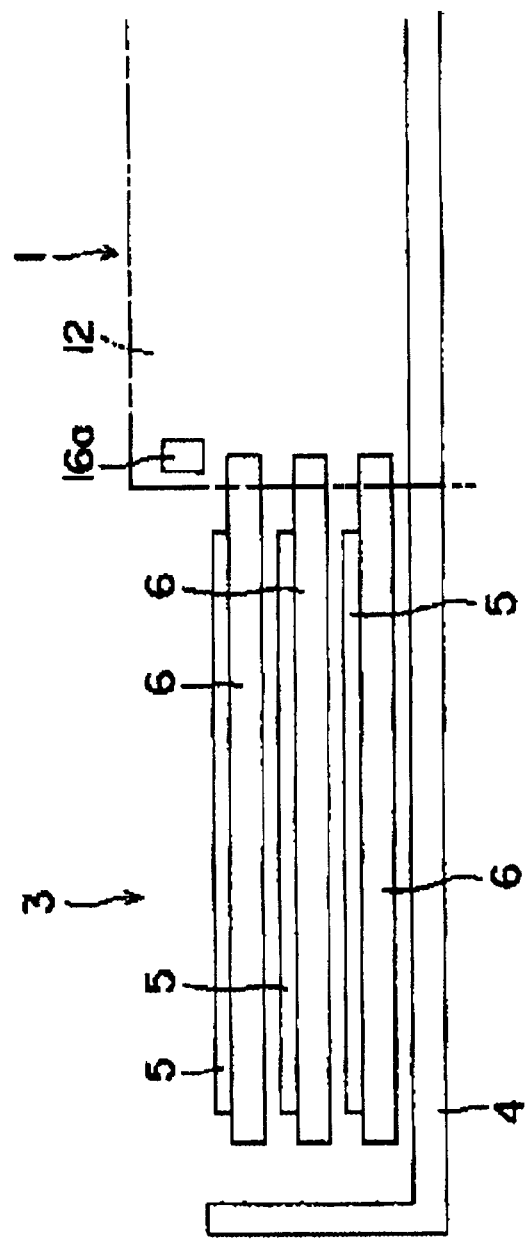
FIG. 20 is a side view showing the relative positions of components when carriages are pulled out in the individual eject mode and also of a schematic structure when the third tier disc is designated for ejection and no discs are being played.

When an individual ejection is designated upon selection of the disc 5 on the third tier carriage 6 when none of the discs 5 is being played, the third tier carriage 6 along with all of the carriages 6 below it, namely the carriages 6 for the second and first tiers, are pulled out in a stack, as shown in FIG. 20.

Figure 9:
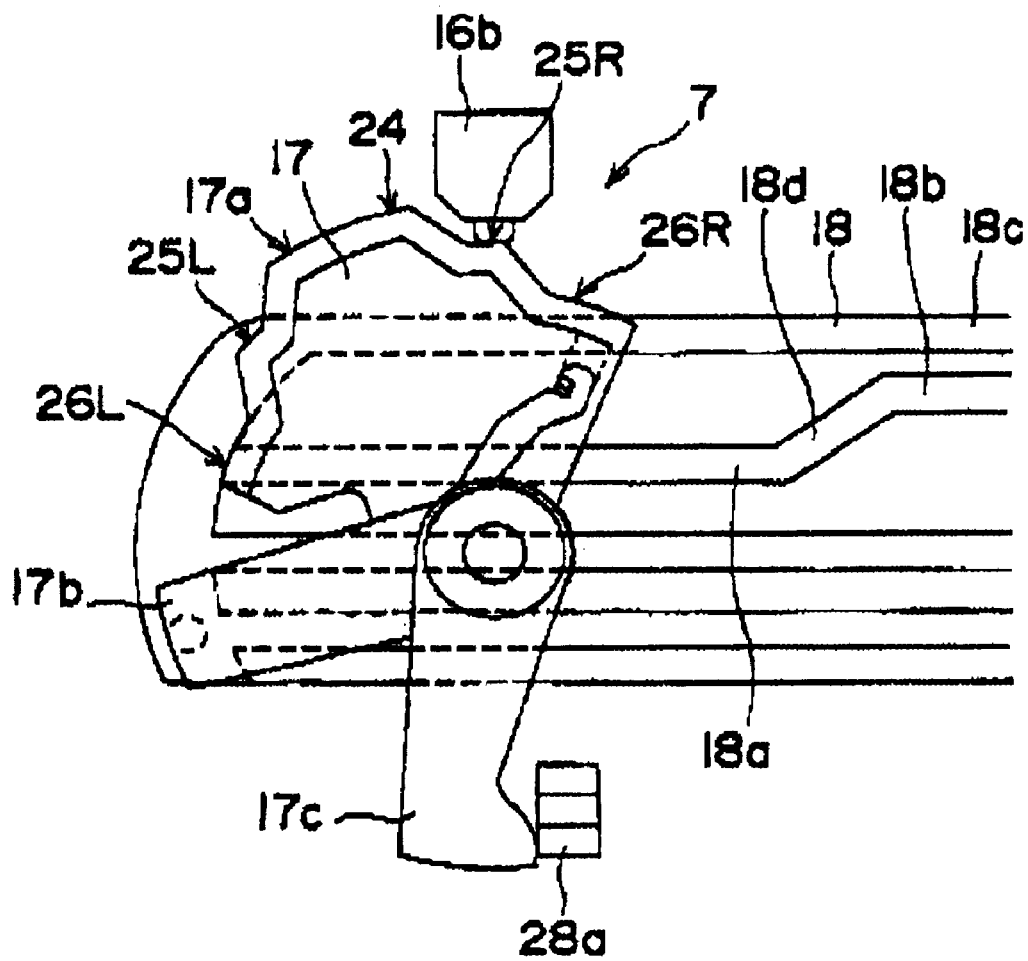
FIG. 9 is a side view of a third tier retaining area of a cam surface of the select bar operating a follower segment of a select arm.
Figure 10:
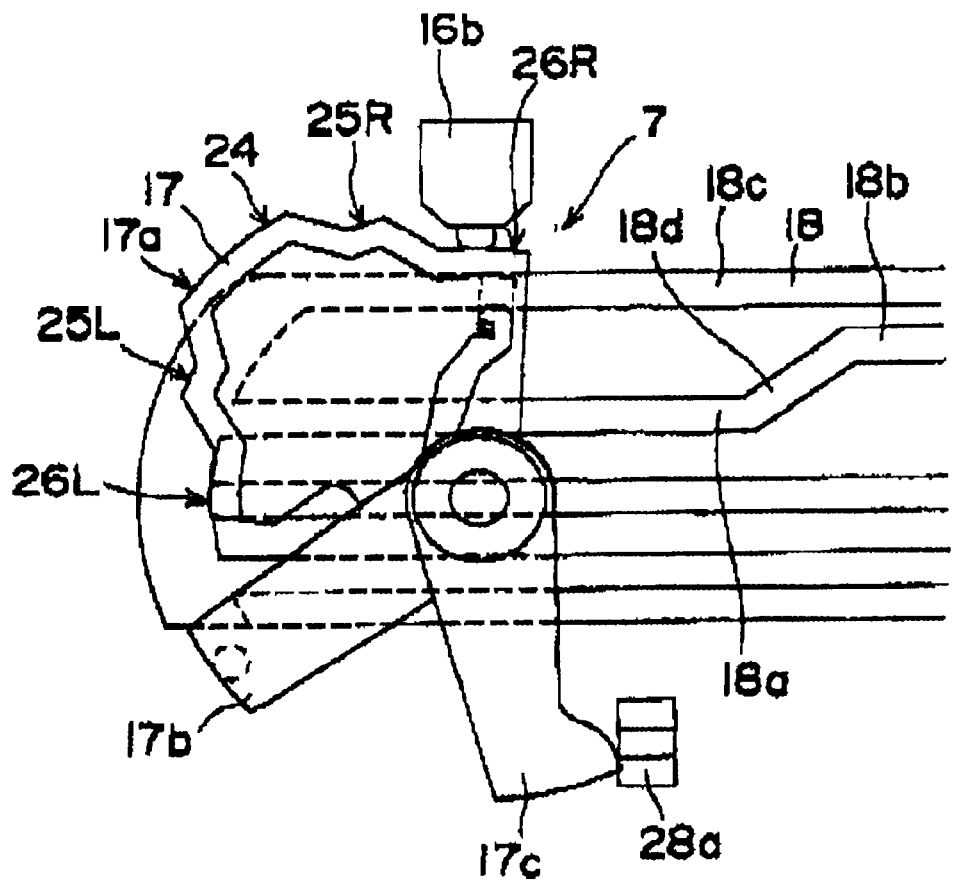
FIG. 10 is a side view of a neutral area of the cam surface of the select bar operating the follower segment of the select arm.
Figure 21:
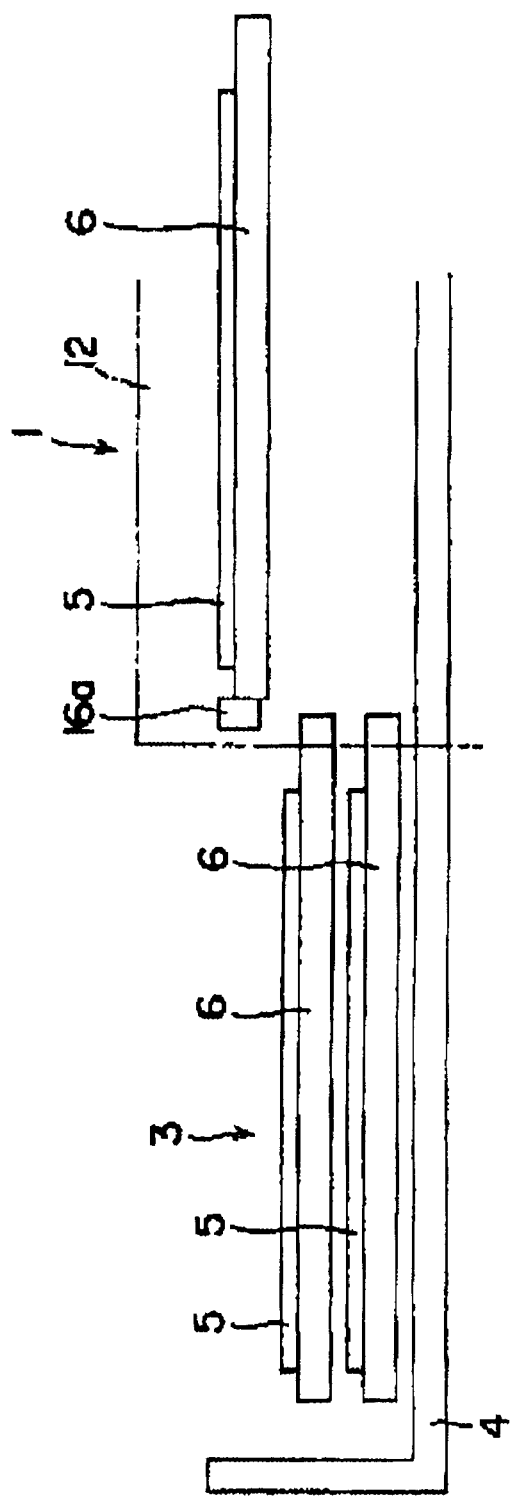
FIG. 21 is a side view showing the relative positions of components when carriages are pulled out in the individual eject mode and also of a schematic structure when the second tier disc is designated for ejection and no discs are being played.

When an individual ejection is designated for the disc 5 on the second tier carriage 6 when none of the discs 5 is being played, the select lever 17 is swung by the control cam 19 into the position shown in FIG. 9. In this position, the third tier retaining area 25R of the cam surface 17a of the select lever 17 operates the select arm 16, and the select arm 16 swings into the third tier retaining position 21. When the drawer 4 is moved towards the second eject position 3 in this state, all of the carriages 6 other than the third tier carriage 6 which is retained by the select arm 16, namely the carriages 6 for the second and first tiers, are pulled out in a stack as shown in FIG. 21. In other words, by having the third tier carriage 6, which is above the second tier carriage 6 with the disc 5 designated by the slide control device 7 functioning as the individual ejection device, move relative to the drawer 4 when the drawer 4 moves, only the carriages 6 for the second and first tiers and not the third tier carriage 6 are pulled out. Additionally, by manually sliding back the second tier carriage 6, the disc 5 on the first tier carriage 6 can be replaced.

As described above, due to the fact that the carriage 6 with the designated disc 5 can be pulled out as the top most carriage 6 in the carriage ejection mechanism according to the present invention, the designated disc 5 can be replaced without any further operations, which improves the ease of use.

Furthermore in this case, because the drawer 4 is moved only to the second eject position 3 which has a shorter moving distance than the first eject position 2, the projection of the drawer 4 is smaller so that less space is required to replace discs 5.

Figure 23:
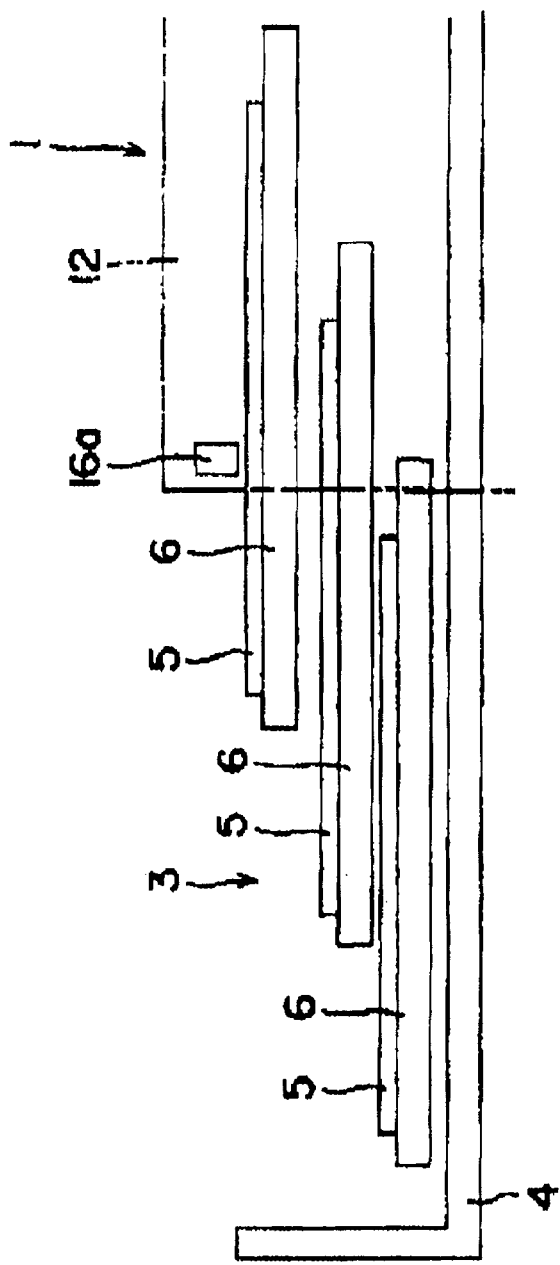
FIG. 23 schematically shows another example of an eject operation in the individual eject mode.

When pulling out the drawer 4 to the second eject position 3, the three carriages 6 can be pulled out slightly staggered in a stair-like manner, as shown in FIG. 23.

Figure 24:
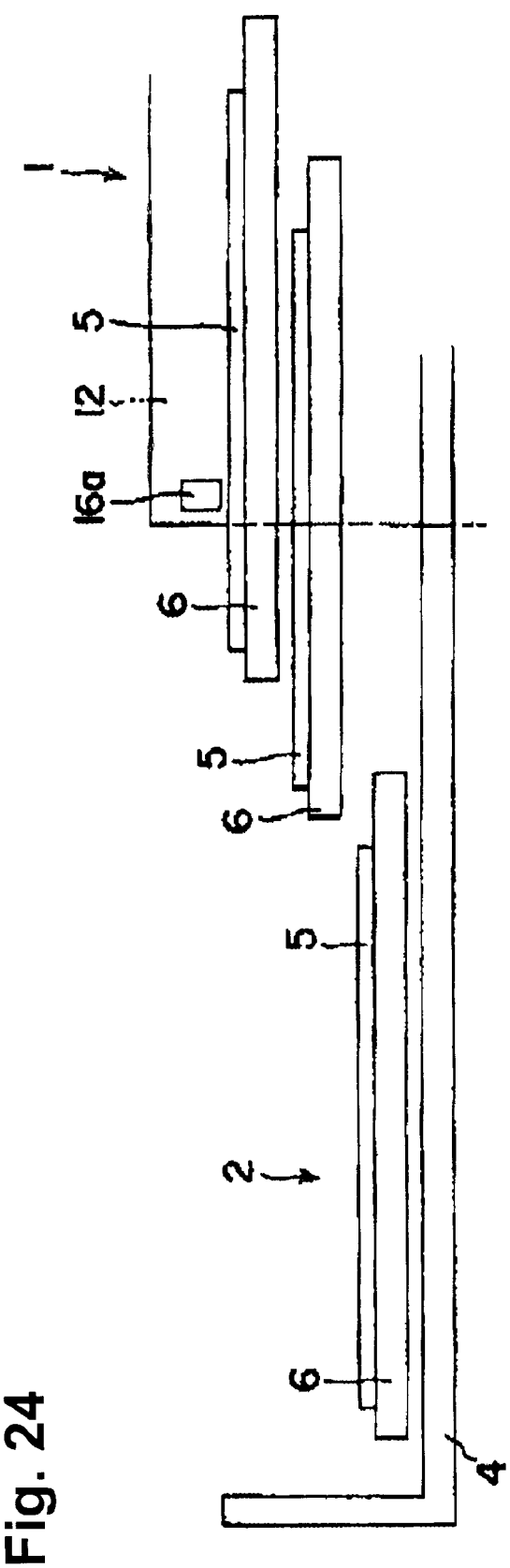
FIG. 24 schematically shows another example of an eject operation in the all eject mode.

In the all eject mode, the disc 5 that is completely exposed, i.e., the disc 5 that can be viewed in its entirety, may be the disc 5 on the first tier carriage 6, as shown in FIG. 24.

Although the above mode is one example of a preferred embodiment of the present invention, many modifications can be made without departing from the present invention. For example, although the carriage retaining devices 9 is attached to the drawer 4 in the above description, the carriage retaining device 9 can be attached to each of the carriages 6.

Furthermore, although the carriages 6 in the second and third tiers are made to move by the friction between each of them and the drawer 4 in the all eject mode, strong friction can be made to be generated by providing a leaf spring, for example, between the drawer 4 and each of the second tier carriage 6 and the third tier carriage 6. Further, this friction generating leaf spring can also be used as the carriage retaining device 9 attached to each of the carriages 6.

Additionally in the above description, the slide control device 7 functioning as the carriage retaining mechanism comprises the select arm 16, the select lever 17, the control groove 18 and the control cam 19, but its composition is not necessarily limited to this. For example, of the all eject and individual eject modes if there were to be only the all eject mode, the control cam 19 can be omitted so that only the control groove 18 would operate the select lever 17.

Figure 25:
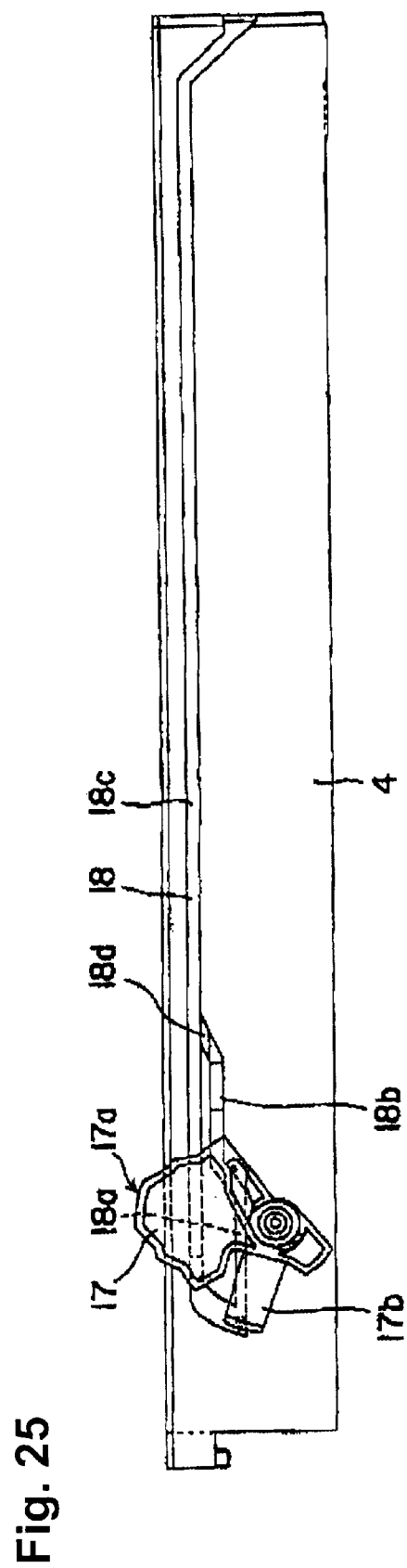
FIG. 25 conceptually shows a carriage retaining mechanism in accordance with a first embodiment of the present invention, which shows the relative positions of the control groove and the select lever.

In this case, how the carriages 6 in various tiers overlap with each other can be varied by changing the length of each of the first through third linear sections 18a–18c. For example, as shown in FIG. 25, by shortening the first linear section 18a and the second linear section 18b and lengthening the part of the third linear section 18c that operates the select lever 17 during ejection (hereinafter called the "operating section of the third linear section 18c"), the disc on the top tier (the third tier) can be completely exposed so that its entirety can be viewed, while the discs 5 on the lower tiers (the first and second tiers) are ejected to positions forward of the first eject position 2 (on the left side of the FIG. 22) stacked and staggered in a stair-like manner. The disc 5 on the top tier is exposed in its entirety and can be replaced without moving its carriage 6. Further, discs 5 on tiers other than the top most tier (i.e., the first and second tiers) are replaced after manually sliding back the carriage(s) 6 above the desired disc 5. In other words, the disc 5 on the top tier can be replaced without any further operations, while the discs 5 on other tiers are replaced after sliding back the upper carriage(s) 6 above it.

Figure 26:
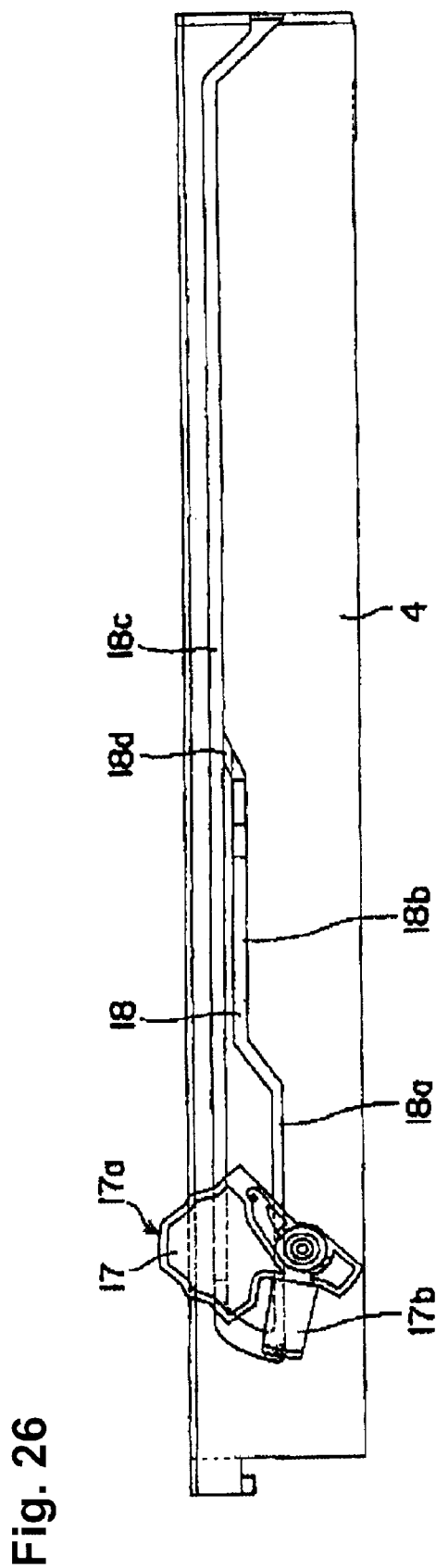
FIG. 26 conceptually shows a carriage retaining mechanism in accordance with a second embodiment of the present invention, which shows the relative positions of the control groove and the select lever.
Figure 27:
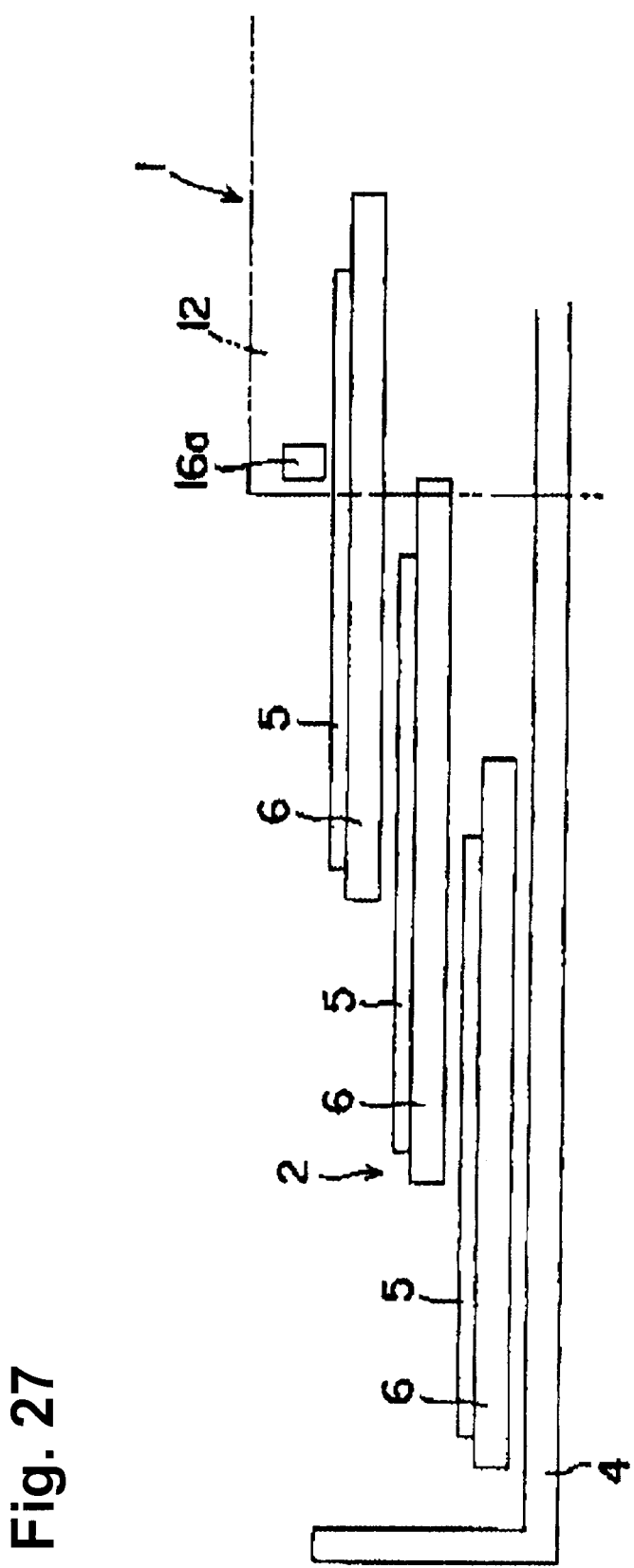
FIG. 27 schematically shows a structure of an ejection using the carriage retaining mechanism in FIG. 26.

Moreover, by making the length of each of the first linear section 18a, the second linear section 18b and of the operating section of the third linear section 18c virtually the same as shown in FIG. 26, all discs 5 are generally made to eject uniformly staggered in a stair-like manner as shown in FIG. 27. To replace one of the discs 5, the carriage 6 with the desired disc 5 and/or carriage(s) 6 above it are manually slid forward or backward to expose the desired disc 5. In other words, a plurality of discs 5 are retained in positions nearly uniformly staggered, so that all of the discs 5 placed on the carriages 6 can be viewed from above nearly uniformly.

Figure 28:
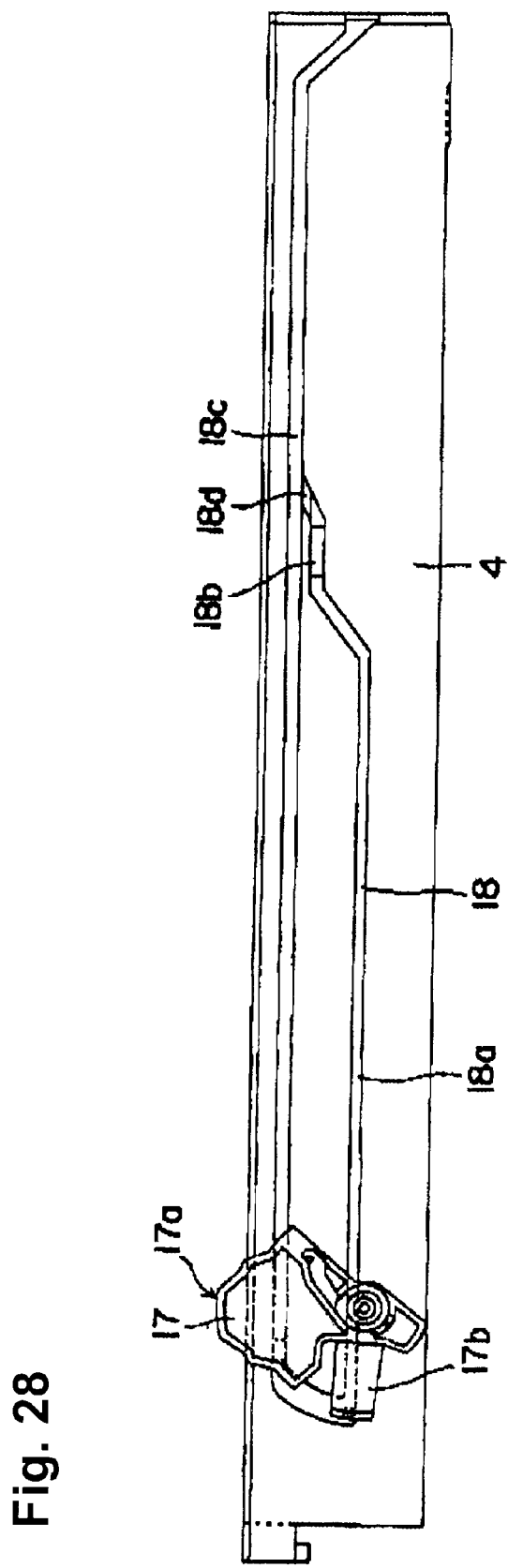
FIG. 28 conceptually shows a carriage retaining mechanism in accordance with a third embodiment of the present invention, which shows the relative positions of the control groove and the select lever.

Also, by lengthening the first linear section 18a and shortening the second linear section 18b and the operating section of the third linear section 18c as shown in FIG. 28, the disc 5 on the bottom tier (the first tier) can be completely exposed so that its entirety can be viewed, while the discs 5 on the upper tiers (the second and third tiers) are ejected to positions relatively rear of the first eject position 2 and staggered in a stair-like manner, as shown in FIG. 24. The disc 5 on the bottom tier is exposed in its entirety and can be replaced without moving its carriage 6. Further, the discs 5 on tiers above the bottom tier (i.e., the second and third tiers) are replaced after manually sliding the carriage 6 with the desired disc 5 and/or the carriage 6 above it to expose the desired disc 5. In other words, the disc 5 on the bottom tier can be replaced without any further operations, while the discs 5 on upper tiers are replaced after sliding the upper carriage(s) 6.

Due to the fact that how the discs 5 overlap each other can be varied easily by changing the shape of the control groove 18 as described above, it will be easy to manufacture products that meet market demands. Although there are three carriages 6 in accordance with the present embodiment, its number is not limited to three and can be five or any other number.

Figure 29:
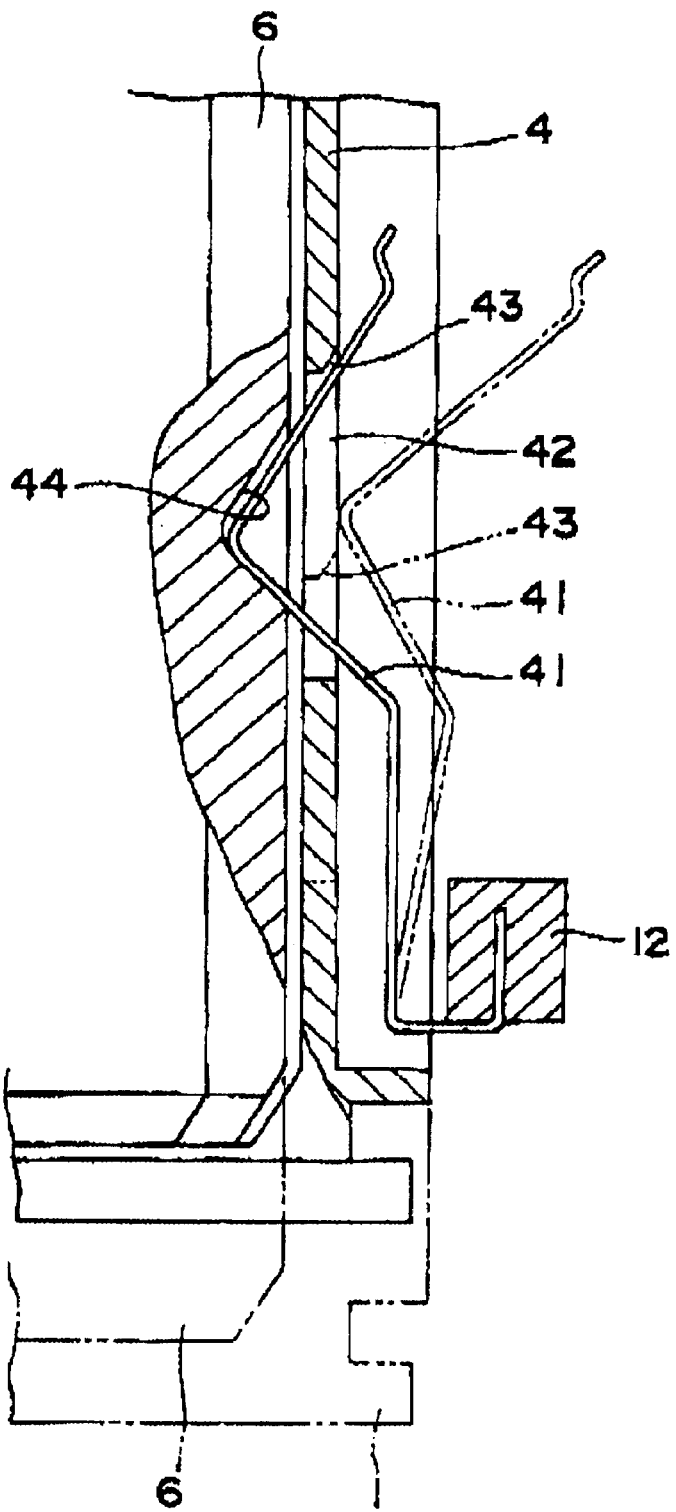
FIG. 29 is a cross-sectional view of a carriage retaining mechanism in accordance with a fourth embodiment of the present invention.
Figure 30:
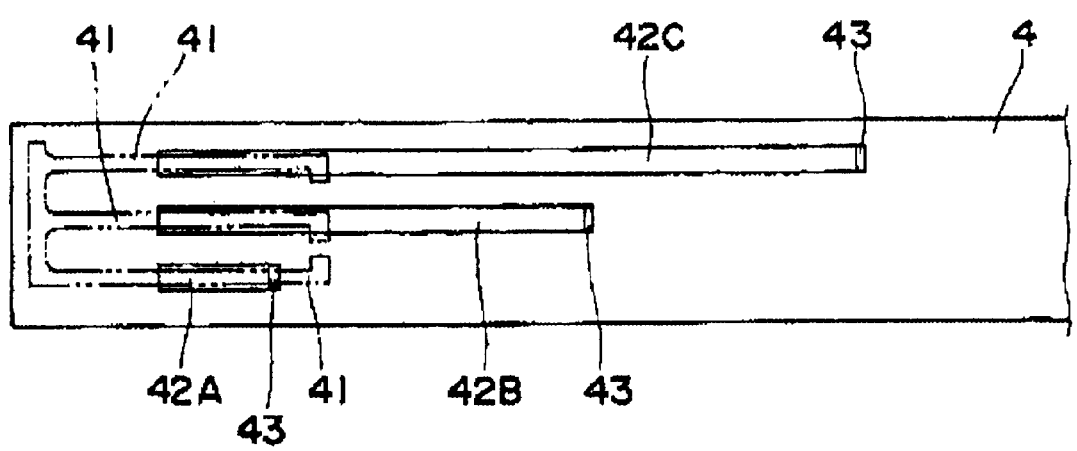
FIG. 30 conceptually shows the relative positions of slits and retaining members of the carriage retaining mechanism in FIG. 29.

Also in the above description, the slide control device 7 is used as the carriage retaining mechanism, but the carriage retaining mechanism does not necessarily have to consist of the slide control device 7. For instance, the carriage retaining mechanism can comprise retaining members 41 fixed to the chassis 12 and slits 42 formed on the drawer 4, as shown in FIGS. 29 and 30.

More concretely, each of the slits 42 is formed on the right wall, for example, of the drawer 4 to correspond to each tier of the carriages 6. Since there are carriages 6 in three tiers in the present embodiment, there are three slits 42. The slit 42 for the first tier carriage 6 (hereinafter called the "first tier slit 42A") is shorter than the slit 42 for the second tier carriage 6 (hereinafter called the "second tier slit 42B"), and the second tier slit 42B is shorter than the slit 42 for the third tier carriage 6 (hereinafter called the "third tier slit 42C"). The slits 42A–42C for the various tiers are formed on the right wall of the drawer 4 near the front end and extend towards the back.

Each of the retaining members 41 can be a leaf spring, for instance, that is provided for each tier of the carriages 6. Since there are carriages in three tiers in the present embodiment, there are three retaining members 41 provided. Each of the retaining members 41 passes through the corresponding slit 42 and fits into a concave section 44 on the side surface of the corresponding carriage 6, and thereby retains each of the carriages 6.

When the drawer 4 moves from the stock position 1 towards the first eject position 2, none of the carriages 6 retained by the retaining member 41 moves and only the drawer 4 moves. The movement of the drawer 4 causes each of the slits 42 to move against the corresponding retaining member 41, which causes a retaining release operating section 43 at the end of each of the slits 42 to come in contact with an inclined part of the corresponding retaining member 41 and presses the retaining member 41 away from the corresponding carriage 6. This causes the retain on the carriage 6 by the retaining member 41 to be released, and subsequently the carriage 6 moves with the drawer 4 by the friction between it and the drawer 4.

In other words, in the relative positions of the drawer 4 and each of the retaining members 41, each of the carriage 6 remains still while in the area where the corresponding slit 42 is formed, but each of the carriage 6 is pulled out along with the drawer 4 while in the area without the corresponding slit 42. Accordingly, the carriage 6 is pulled out more the shorter the corresponding slit 42 is, while it is pulled out less the longer the corresponding slit 42 is. In the present embodiment the slit length grows shorter in the order of the first tier slit 42A, the second tier slit 42B and the third tier slit 42C, which device that the amount the carriage 6 is pulled out grows greater in the order of the first tier carriage 6, the second tier carriage 6 and the third tier carriage 6, so that the carriages 6 are ejected successively staggered in a stair-like manner with the eject operation of the drawer 4. In other words, the carriage retaining mechanism comprising the retaining members 41 and the slits 42 causes the carriages 6 to stack inside the drawer 4 staggered towards the back of the drawer 4 in sequence from the bottom tier when the discs 5 are ejected, and retains the carriages 6 in such a way that whether all discs 5 are in place can be checked by viewing the discs 5 from above.

By changing the lengths of the slits 42A–42C of the various tiers and thereby changing the positions of the retain release operating sections 43, how the carriages 6 of various tiers overlap with each other can be varied. For example in FIG. 30, the first tier slit 42A is short, the third tier slit 42C is long, and the length of the second tier slit 42B is in between the lengths of the first tier slit 42A and the third tier slit 42C; as a result, the carriages 6 in various tiers are ejected overlapping each other in the manner shown in FIG. 27. On the other hand, by generally shortening the lengths of the slits 42A–42C of various tiers having different lengths, the carriages 6 can be ejected overlapping each other in the manner shown in FIG. 22. Furthermore, by shortening the first tier slit 42A and relatively lengthening the second tier slit 42B and the third tier slit 42C, the carriages 6 in various tiers can be ejected overlapping each other in the manner shown in FIG. 24.

When the carriage retaining mechanism is constructed with the retaining members 41 and the slits 42 in this way, the structure is simple, the productivity high, and the manufacturing costs can be reduced due to the small number of parts. Although there are three carriages 6 in the present embodiment, its number is not limited to three and can be five or any other number.

As described above, the carriage ejection mechanism according to the present invention comprises a drawer that moves back and forth between a stock position and an eject position, and a plurality of carriages contained in the drawer and on which discs are placed; since the carriages are ejected successively staggered in a stair-like manner with an eject operation of the drawer, discs on all carriages can be checked all at once. As a result, checking the discs in stock and replacing discs become easy, which improves the ease of use.

In the carriage ejection mechanism described above, by having at least one of the carriages eject in such a way that its disc can be viewed in its entirety, at least one disc can be replaced after checking the discs. This further enhances the ease of use.

Further, the carriage ejection mechanism according to the present invention comprises a drawer, which moves back and forth between a stock position and two eject positions, and a plurality of carriages contained inside the drawer and on which discs are placed; since the carriages eject successively staggered in a stair-like manner with an eject operation of the drawer to the first eject position and since a designated carriage and all carriages below it eject in a stacked manner with an eject operation of the drawer to the second eject position, there are two modes of eject operation to choose from, which provides a carriage ejection mechanism with high ease of use.

In the carriage ejection mechanism described above, the ease of use can be even further improved by containing in a drawer a plurality of carriages in a manually slidable manner when the drawer is ejected.

Furthermore, since the carriage retaining mechanism according to the present invention retains the carriages so that the carriages within the drawer are stacked in a staggered manner towards the back of the drawer in sequence from the bottom tier when the discs are ejected. Accordingly, the carriages can be ejected successively staggered in a stair-like manner and therefore all discs are in place can be checked as viewed from above when the discs are ejected. As a result, checking the discs in stock and replacing discs become easy, which improves the ease of use.

In this case, in an ejected state, the top most disc can be replaced without moving the carriage that holds the top most disc, and discs on tiers below can be replaced after moving the upper carriage(s). Alternatively, in an ejected state, the bottom disc can be replaced without moving the carriage that holds the bottom disc, and discs on tiers above can be replaced after moving the carriages. Further, in an ejected state, the plurality of carriages can be retained in positions nearly uniformly staggered, so that discs on the carriages can be viewed in a nearly uniform manner from above.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A carriage ejection mechanism comprising:
   a drawer that moves back and forth between a stock position and an eject position; and
   a plurality of carriages contained in the drawer,
   wherein the plurality of carriages are ejected successively staggered in a stair-like manner in an eject operation of the drawer and at the eject position the plurality of carriages are arranged so as to be independently slidable toward the stock position.

2. A carriage ejection mechanism according to claim 1, wherein at least one of the carriages is ejected such that a top mounting area of the carriage ejected is generally entirely exposed, wherein the carriage moves in the direction between the stock position and the eject position and a mounting surface of the carriage for an object to be mounted is provided along the direction between the stock position and the eject position and generally an entire area of the mounting surface of the carriage is exposed at the eject position.

3. A carriage ejection mechanism according to claim 1, wherein the plurality of carriages stored in the drawer are manually slidable in the eject position and each of the carriages is arranged in such a manner that the mounting surface of the carriage is exposed by manually sliding the upper carriage.

4. A carriage ejection mechanism according to claim 1, further comprising a slide control device that slides the carriages towards the stock position relative to the drawer when the drawer moves towards the eject position, wherein the slide control device slides an upper one of the carriages relatively more towards the stock position than a lower one of the carriages and the drawer moves horizontally and the carriages move horizontally with respect to the drawer and the respective carriages are capable of moving independently.

5. A carriage ejection mechanism according to claim 4, wherein the amount of slide of a topmost one of the carriages allows at least a part of a disc mounting surface thereof to be exposed.

6. A carriage ejection mechanism according to claim 4, wherein the slide control device slides all of the carriages to be pulled out in a slightly staggered stair-like manner such that at least a part of each of disc mounting surfaces of the carriages is exposed.

7. A carriage ejection mechanism comprising:
   a drawer that moves back and forth between a stock position and two eject positions; and
   a plurality of carriages that are contained I side the drawer, wherein the carriages are ejected successively staggered in a stair-like manner with a first eject mode in which the drawer moves to a first eject position, and a selected one of the carriages and other ones of the carriages therebelow are ejected in a stacked manner with a second eject mode in which the drawer moves to a second eject position.

8. A carriage ejection mechanism according to claim 7, wherein, in the first eject mode, at least a part of a disc mounting surface of each of the carriages is exposed.

9. A carriage ejection mechanism according to claim 7, wherein the plurality of carriages stored in the drawer are manually slidable in the two eject positions.

10. A carriage ejection mechanism according to claim 7, wherein the carriages inside the drawer can be slid back to the stock position when the drawer is ejected.

11. A carriage ejection mechanism according to claim 7, further comprising an individual ejection device that keeps in the stock position other of the carriages above a selected one of the carriage when the drawer moves to the second eject position.

12. A carriage ejection mechanism according to claim 7, wherein a disc mounting area of a top most one of the carriages is generally fully exposed, while a lower one of the carriages below the top most carriage is substantially covered by the top most carriage, and the lower one of the carriages below the top most carriage is generally fully exposed by moving the top most carriage toward the back of the drawer.

13. A carriage ejection mechanism according to claim 12, wherein the plurality of carriages are retained in positions nearly uniformly staggered in the eject position.

14. A carriage ejection mechanism according to claim 7, wherein a disc mounting area of a bottom one of the carriages is generally fully exposed, while an upper one of the carriages above the bottom carriage is not fully exposed, and the upper one of the carriages above the bottom carriage is generally fully exposed by moving the bottom carriage toward back of the drawer.

15. A carriage retaining mechanism in a housing including a plurality of carriages and a drawer that contains the plurality of carriages in a slidable manner and moves the plurality of carriages outside the housing to an eject position, the carriage retaining mechanism comprising:
   a retaining device that retains the carriages in the drawer stacked in a staggered manner towards a back of the drawer in sequence from a bottom one of the carriages, wherein the retaining device retains the carriages in such a manner that the respective carriages are independently movable within the drawer at a position outside the housing in the direction from the eject position to an inside position.

16. A carriage retaining mechanism according to claim 15, wherein the retaining device positions the carriages successively staggered in a stair-like manner with the bottom one of the carriages ejected more than the other of the carriages.

17. A carriage retaining mechanism according to claim 15, wherein the plurality of carriages in the drawer are manually slidable in the eject position.

18. A carriage retaining mechanism according to claim 15, further comprising a slide control device that slides the carriages towards a stock position opposite to the eject position relative to the drawer when the drawer moves towards the eject position, wherein the slide control device slides and upper one of the carriages relatively more towards the stock position than a lower one of the carriages.

19. A carriage retaining mechanism according to claim 15, wherein a disc mounting area of a top most one of the carriages is generally fully exposed, while a lower one of the carriages below the top most carriage is substantially covered by the top most carriage, and the lower one of the carriages below the top most carriage is substantially covered by the top most carriage, and the lower one of the carriages below the top most carriage is generally fully exposed by moving the top most carriage toward the back of the drawer.

20. A carriage retaining mechanism according to claim 15, wherein a disc mounting area of a bottom one of the carriages is generally fully exposed, while an upper one of the carriages above the bottom carriage is not fully exposed, and the upper one of the carriages above the bottom carriage is generally fully exposed by moving the bottom carriage toward the back of the drawer.

21. A carriage retaining mechanism according to claim 15, wherein the plurality of carriages are retained in positions nearly uniformly staggered in the eject position.

* * * * *